United States Patent [19]

Nitta et al.

[11] Patent Number: 5,251,318
[45] Date of Patent: Oct. 5, 1993

[54] MULTIPROCESSING SYSTEM COMPARING INFORMATION COPIED FROM EXTENDED STORAGE BEFORE AND AFTER PROCESSING FOR SERIALIZING ACCESS TO SHARED RESOURCE

[75] Inventors: Jun Nitta, Yokohama; Shigeru Yoneda, Ebina; Tetsuo Murakawa, Hiratsuka, all of Japan

[73] Assignee: Hitachi, Ltd., Tokyo, Japan

[21] Appl. No.: 397,679

[22] Filed: Aug. 23, 1989

[30] Foreign Application Priority Data

Sep. 2, 1988 [JP] Japan ................. 63-218385
Sep. 14, 1988 [JP] Japan ................. 63-228683

[51] Int. Cl.⁵ ........................................... G06F 13/00
[52] U.S. Cl. .................................. 395/725; 395/425;
364/230; 364/259.2; 364/261.2; 364/DIG. 1
[58] Field of Search ............... 364/200, 900; 395/425, 395/575, 725, 800

[56] References Cited

U.S. PATENT DOCUMENTS

| | | | |
|---|---|---|---|
| 4,145,739 | 3/1979 | Dunning et al. | 364/200 |
| 4,480,304 | 10/1984 | Carr et al. | 364/200 |
| 4,604,694 | 8/1986 | Hough | 364/200 |
| 4,733,352 | 3/1988 | Nakamura et al. | 364/200 |
| 4,754,398 | 6/1988 | Prinbow | 364/200 |
| 4,888,681 | 12/1989 | Barnes et al. | 364/200 |
| 4,897,782 | 1/1990 | Bennett et al. | 364/200 |

FOREIGN PATENT DOCUMENTS 60-142766   7/1985   Japan .

Primary Examiner—Thomas C. Lee
Attorney, Agent, or Firm—Antonelli, Terry, Stout & Kraus

[57] ABSTRACT

In a composite data processing system including a plurality of data processing units each containing one or a plurality of instruction processors and a main storage accessed by the instruction processor, and an extended storage shared by the data processing units and accessed by each of the instruction processors, the present invention provides a composite data processing system characterized by including a means for referring to a designated area on the extended storage by each of the instruction processors, a means for rewriting the area described above in accordance with the value of part of the entire part of the area based on the result of a referring operation and a means for generating an instruction for executing the operations from the reference operation to the rewrite operation as an inseparable operation.

8 Claims, 28 Drawing Sheets

MS : MAIN STORAGE
ES : EXPANDED STORAGE

FIG. 21

| HELD LOCK MODE \ REQUESTED LOCK MODE | SR | SU | PR | PU | EX |
|---|---|---|---|---|---|
| S R | O | O | O | O | × |
| S U | O | O | × | × | × |
| P R | O | × | O | × | × |
| P U | O | × | × | × | × |
| E X | × | × | × | × | × |

O : COEXISTING
× : NOT COEXISTING

FIG. 22

| JUST HELD LOCK MODE \ PRESENTLY REQUESTED LOCK MODE | SR | SU | PR | PU | EX |
|---|---|---|---|---|---|
| S R | O | × | × | × | × |
| S U | O | O | × | × | × |
| P R | O | × | O | × | × |
| P U | O | O | O | O | × |
| E X | O | O | O | O | O |

O : INCLUDED
× : NOT INCLUDED

MULTIPROCESSING SYSTEM COMPARING INFORMATION COPIED FROM EXTENDED STORAGE BEFORE AND AFTER PROCESSING FOR SERIALIZING ACCESS TO SHARED RESOURCE

BACKGROUND OF THE INVENTION

1. Field of the Invention

This invention relates to a computer system having a multiprocessor construction, and more particularly to a composite data processing system and its control method for managing efficiently common data resources in a multiprocessor system of the type which does not share a main storage but does share an extended storage.

2. Description of the Prior Art

Configuration of a computer system having a multiprocessor construction has been employed in order to improve performance by load sharing and reliability by diversification of risks. A so-called "tightly coupled multiprocessor system" wherein a plurality of instruction processors share a main storage and a so-called "loosely coupled multiprocessor system" wherein a plurality of data processors (each of which may by itself be composed of a single processor or a tightly coupled multiprocessor) share an external storage are known generally as the forms of the multiprocessor systems. The problem with these multiprocessor systems is ,an efficient management method for accessing the common data resource inside the systems, and particularly, a serialization method for accessing the common data resource by a plurality of processors while keeping data coordination. Various contrivances have been made in the past to solve this problem.

In the tightly coupled multiprocessor system, a mechanism for serializing accesses to the common resources can be constituted by making access to control information on the main storage by use of a specific instruction, and an example of such a mechanism is disclosed in Japanese Patent Laid-Open No. 92061/1987. The specific instruction hereby mentioned is the one that reads a state variable on the main storage, stores the value in a preservation area and executes the operation of changing the state variable in accordance with the value as an unseparable operation. In HITAC M-series processors, for example, CS (Compare and Swap) command is a typical command corresponding to such an instruction. (The CS command is discussed in the reference described above, too.)

In this CS command, the data or its part (hereinafter referred to as the "first operand") that has in advance been read (loaded) from a designated area on the main storage into one of the general purpose registers inside the instruction processor for calculation processing is compared with the data or its part (hereinafter referred to as the "first double word of second operand") presently existing on the designated area on the main storage described above (or after the calculation processing), and if the result of the comparison proves coincident, rewrites the data in the designated area of the main storage (hereinafter referred to as the "second operand". In this case, it is the same as the first double of the second operand) by the new data as the result of processing (hereinafter referred to as the third operand", which is stored, for example, in the other general purpose register in the instruction processor). (In other words, the new data is stored in the designated area of the main storage described above.) This comparison is made in order to prevent the following error. Namely, if the designated area of the common main storage is rewritten by other instruction processors during the period from the load operation to the store operation in the tightly coupled multiprocessor (or in other words, if the result of the comparison is not coincident), the data obtained as the result of processing by other instruction processors will be lost if the data is stored on the rewritten area and the wrong data is stored as such. If the result of the comparison is not coincident, the operation is carried out again from the beginning (from the load operation). Hereinafter, an instruction for such an operation will be referred to as the "CS type instruction".

As to the loosely coupled multiprocessor, on the other hand, a method which communicates control information between data processing units and serializes the access to the common data resource is disclosed in Japanese Patent Laid-Open No 145349/1987. A method which disposes a specific controller for making exclusive control between the data processing units is disclosed in Japanese Patent Laid-Open No. 81748/1984. In the loosely coupled multiprocessor, an instruction corresponding to the CS type instruction in the tightly coupled multiprocessor does not exist generally. Therefore, the overhead of the external storage access is by far greater than that of the main storage access and a CS type instruction for gaining access to the external storage is not realistic from the aspect of performance.

It is a recent trend to use an extended storage as a new memory hierarchy which buries the time difference between the main storage and the external storage. The extended storage can be directly read/written by a specific instruction from an instruction processor and unlike a disk memory held in a disk controller, it does not need the disposition of a channel apparatus between it and the main storage. Furthermore, its access time is greater than that of the main storage but is smaller than that of the external storage. Here, though it is possible to conceive a multiprocessor system which does not share the main storage but shares the extended storage and the external storage, such a multiprocessor system is out of the scope of the conventional technology techniques described above.

Generally speaking, the looser the degree of coupling of a multiprocessor system, the easier it becomes to improve the flexibility and reliability of the overall system. (A loose multiprocessor system can contain a tighter multiprocessor system as part of its constituent elements.) However, the communication overhead between the data processing units for managing the access to the shared data resource increases, on the contrary. The multiprocessor system of the form which shares the extended storage is the one that is positioned at an intermediate position between the conventional tightly coupled multiprocessor system and the loosely coupled multiprocessor system, and it has a means for accomplishing a system having a higher flexibility than the tightly coupled multiprocessor system with a lower overhead than the loosely coupled multiprocessor system. When a practical application system is constituted as a multiprocessor system, the configuration to be employed may be determined by taking into consideration the functions and performance required by such a system. Generally, such a system can be accomplished as a composite form of multiprocessors having various forms.

In the so-called "loosely coupled multiprocessor system" wherein a plurality of data processing units do not share the main storage but a file, a method of controlling the access to a common data resource is disclosed, for example, in Japanese Patent Laid-Open No. 145349/1988. This reference describes the method which couples the plurality of data processing units by a communication apparatus and makes the serialization control by transmitting a lock request to a lock manager on a data processing unit of an lock master determined for each common data resource. This reference describes also a method of continuing the system operation by letting another data processing unit function as a new master for a common data resource for which a certain data processing unit has been the master, when the latter undergoes break-down.

The second method for accomplishing the exclusive control of the common data resource by the communication between the data processing units in the loosely coupled multiprocessor system is disclosed in Japanese Patent Laid-Open No. 172764/1983. In this known reference, the lock manager sends the lock requests between the data processing units and makes the exclusive control between the data processing units by the majority voting system which makes the lock request effective when the majority of all the data processing units approve the lock request Japanese Patent Laid-Open No. 81748/1984 discloses a method which disposes a specific controller in order to execute the serialization control between a plurality of data processing units. In this known reference, each data processing unit issues a lock or unlock instruction for the specific controller described above. Since the exclusive control is made by the single controller which is separate from the data processing units in accordance with this method, this method can reduce the serialization exclusive control overhead between the data processing units and can easily detect a deadlock bridging between a plurality of data processing units.

When the serialization control of the access to the common data resource is carried out in the loosely coupled multiprocessor, the greatest problem is the communication overhead In Japanese Patent Laid-Open Nos. 145349/1987 and 172764/1983 described above, the communication overhead of the exclusive control information between the data processing units coupled by the communication apparatus becomes the problem. In Japanese Patent Laid-Open No. 81748/1984, the communication overhead of the exclusive control information between the data processing units and an exclusive controller for the exclusive control becomes the problem. In order to control dispersedly the lock queue in each data processing unit, the technique described in Japanese Patent Laid-Open Nos. 145349/1988 and 72764/1983 must exchange the lock queue information between the data processing units so as to detect the so-called "global deadlock" where the lock queue loop bridges between the data processing units, and invites a large communication overhead. In Japanese Patent Laid-Open No. 145349/1987 described above, when a certain data processing unit gets out of order and assigns its master right to another data processor, the communication between the lock managers becomes necessary. Each subsystem disposes the buffer pool and makes buffering in order to reduce the number of accesses to the file but to keep coordination of the data stored in these buffer pools, and communication for synchronizing the occurrence of data updating must be made between the subsystems.

Furthermore, when the common file gets out of order, each subsystem must align the journal information which records updating of the data in the time series and merges it with the backup copy of the file content, and communication between the data processing units becomes necessary in order to give a common unique time sequence to all the subsystems. Since Japanese Patent Laid-Open No. 81748/1984 described above manages the lock information by the specific controller, it can considerably reduce the excessive communication overhead described above but the specific hardware is necessary and moreover, there is the possibility that this controller results in the bottleneck of performance, reliability, extensibility and economy of the system as a whole.

An extended storage, which is positioned substantially in the same line as the main storage and can be shared between a plurality of data processing units, is about to be accomplished in addition to the memory hierarchy of the main storage - secondary storage of the conventional computer system. The extended storage is a storage that can be used generally in computer systems and its economy is high. However, Japanese Patent Laid-Open No. 81748/1984 described above does not at all mention the method of using this common extended storage.

SUMMARY OF THE INVENTION

In a multiprocessor system of the type wherein a plurality of data processing units (each of which may be a multiprocessor system sharing a main storage) share an extended storage, it is a first object of the present invention to provide a composite data processing system and method which can efficiently accomplish management of a common data resource.

In a loosely coupled multiprocessor system of the type wherein an extended storage is shared, it is a second object of the present invention to provide an access control method which can efficiently accomplish the serialization of accesses from a plurality of subsystems to a common data resource by utilizing a shared extended storage and can keep usability of data for the occurrence of various failures of the system.

In a composite data processing system of the type which includes a plurality of data processing units each containing at least one of a plurality of instruction processors and a main storage accessed by the instruction processors, and an extended storage shared by the data processing units and accessed by each of the instruction processors, the composite data processing system of the present invention for accomplishing the first object described above is characterized in that reference is made to a designated area on the extended storage by each one of the instruction processors, the area is rewritten in accordance with the value of part or the entire part of the area based on the result of the referring, and an instruction for executing the operations from the referring operation to the rewriting operation as an inseparable instruction is issued.

In a method of managing accesses to a common data resource in a loosely coupled multiprocessor system of the type wherein a plurality of data processing units share an extended storage in addition to a file, the present invention for accomplishing the second object described above is characterized in that exclusive control information on an individual common data resource is held on a main storage of the data processing unit, exclusive control information on the common data resource, which is clustered, is held on the common extended storage, a lock manager on each one of the data processing units make exclusive controls between the subsystems inside its own data processing unit by utilizing the exclusive control information on the main storage and makes the exclusive control between the data processors by utilizing the exclusive control information on the common extended storage

BRIEF DESCRIPTION OF THE DRAWINGS

FIG. 21 is a table showing compatibility of the lock modes;

FIG. 22 is a table showing inclusiveness of the lock modes;

DESCRIPTION OF THE PREFERRED EMBODIMENTS

Figure 1:
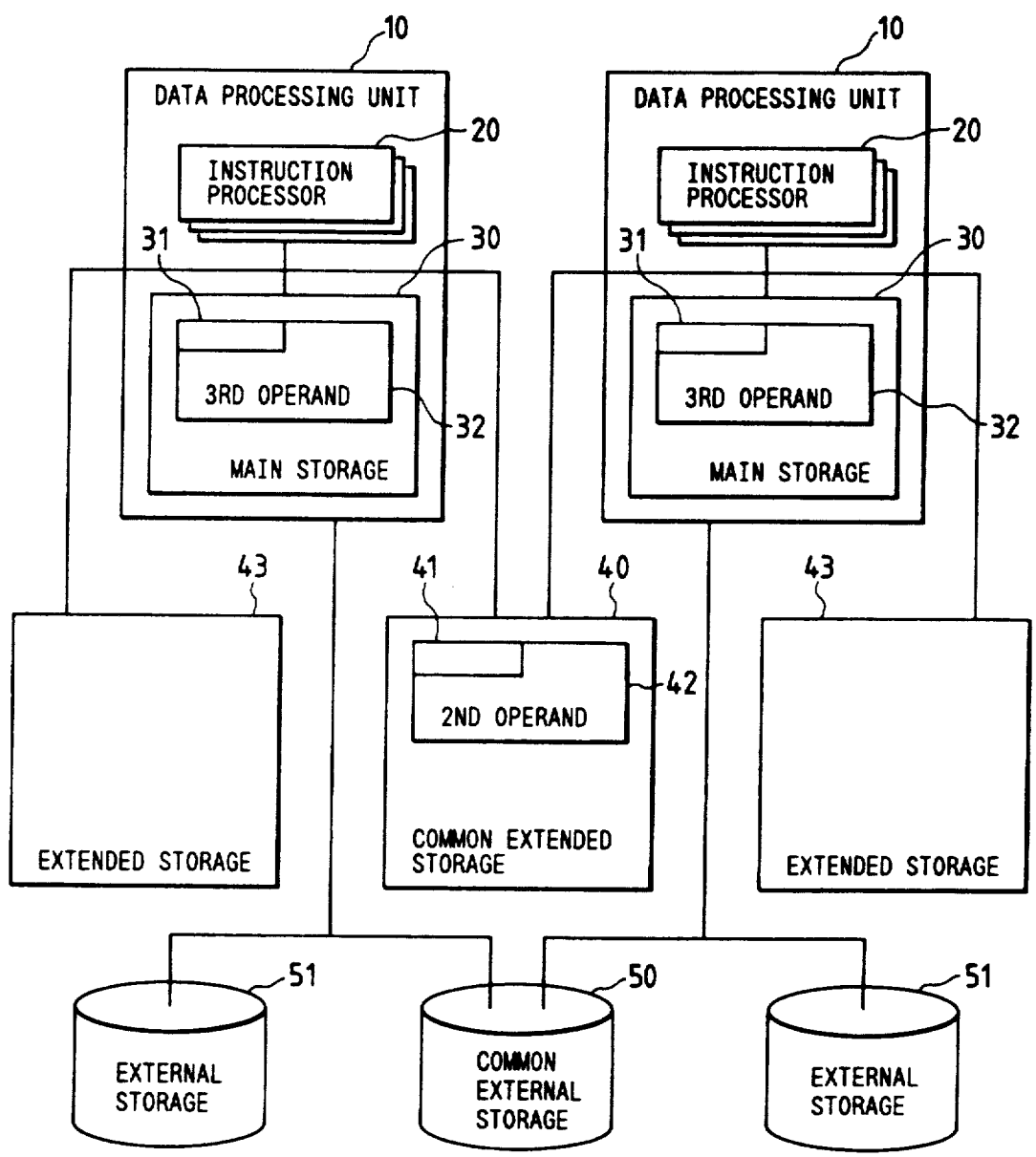
FIG. 1 is a block diagram showing the configuration of the first embodiment of the present invention.

Hereinafter, preferred embodiments of the present invention will be described in detail with reference to the accompanying drawings

FIRST EMBODIMENT

First of all, the data processor in the first embodiment of the present invention may have any of the following constructions (1) through (3): (1) In a composite data processing system wherein a plurality of data processors share an extended storage, the system includes means for referring to a designated area of the extended storage by each instruction processor, means for updating the designated area in accordance with the value of part of the entire portions of the area based on the result of referring and means for generating an instruction (extended CS instruction, CDSE instruction) for executing the operation from the reference operation to the updating operation as an inseparable instruction.

Here, the term "inseparable instruction" means that the access to the area described above by the other processors is not permitted but is to be awaited until the updating is finished after the referring operation.

(2) In a composite data processing system wherein a plurality of data processors share an extended storage, the system includes a comparison means for comparing the first operand designated on a general purpose register or a main storage with part of or the whole of the first double word of a second operand of the designated area on the extended storage by each of the instruction processors, a write means for writing selectively the content of the designated area (third operand) on the main storage into the designated area (second operand) on the extended storage in accordance with the result of the comparison and a means for generating an instruction for execution of the operations from the comparison operation by the comparison means to the write operation by the write means as an inseparable instruction in series with the access by the other instruction processors to the area (second operand area) on the extended area.

(3) In a composite data processing system wherein a plurality of data processors share an extended storage, the system includes a means for referring to a designated area on the extended storage by each of the instruction processors, a means for updating an area on the extended storage designated separately from the designated area described above in accordance with the value of the designated area based on the result of the referring and a means for generating an instruction for executing the operations from the reference operation to the updating operation as an inseparable instruction.

The management of the common data resources in the first embodiment of the present invention can be accomplished by any of the following methods (4) to (6):

(4) In a management method of a common data resource in a multiprocess system where a plurality of processes are executed in parallel on a composite data processing system, the method has the construction wherein a designated area on a common extended storage is used as a lock byte area, each process gains access to the lock byte area by use of the instruction described above for executing the operations from the referring or comparison operation to the rewrite or write operation as the inseparable instruction described above and each process judges by itself whether or not it can use exclusively the common data resource from the value of the lock byte so as to accomplish the exclusive control between a plurality of processes.

(5) In a management method of a common data resource in a multiprocessor system where a plurality of processes are executed in parallel on a composite data processing system, the method has the construction wherein each process gains access to the data of the designated area on the extended storage consisting of the lock byte or the counter area and the data main body by use of the instruction for executing the operations from the referring or comparison operation to the rewrite or write operation described above as the inseparable instruction, non-competition of the access to the data with other processes is confirmed from the value of the lock byte or counter area and at the same time, the content of the data is rewritten so that the common data on the extended storage can be accessed while keeping data coordination.

(6) The common data resource is disposed on the common extended storage or the common external storage, the control data for managing the common data resource (the data main body described in item (5)) is disposed on the common extended storage and each process manages the control method by applying the data resource management method described in the item (4) or (5) to the control data management method so as to manage the access to the common data resource corresponding to the control data.

The instruction for gaining access to the extended storage can be regarded as a modification of the CS type instruction in the tightly coupled multiprocessor system so that it can be applied to the extended storage access, too. The original CS instruction (not having the extended storage) compares the designated data (first operand, that is, the data that has in advance been read into the general purpose register from the main storage before processing) with the designated area on the main storage (first double word of second operand, that is, the data existing at present on the main storage) and rewrites the area on the main storage (second operand, that is, the old data that still remains) by the separately designated data (third operand, that is, the new data obtained as a result of processing) if the result of the comparison proves coincident. This operation is serialized with the operation of the other instruction processors for gaining access to the first double word of the second operand through the hardware. In the case of the CS instruction, each data has a one-word length. The first operand and the third operand are designated by the general purpose register on the instruction processor and the first double word of the second operand and the second operand are in the same area on the main storage.

In contrast, in the CS type instruction in the extended storage access in the first embodiment of the present invention (hereinafter referred to as the "extended CS type instruction"), the first double word of the second operand and the second operand are the area on the extended storage and the former is part of the latter (inclusive of the case where they are coincident) or the former and the latter are areas that can be designated separately. In the extended CS type instruction, the first operand and the third operand are disposed on the general purpose register or main storage.

Management of the common data resource can be made in the multiprocessor system not sharing the main storage but sharing the extended storage, to which the first embodiment of the present invention is directed, by applying the management system of the common data resource. This has been employed for the control information on the main storage by use of the CS type instruction in the tightly coupled multiprocessor, to the control information on the extended storage by use of the extended CS type instruction.

However, the extended storage has generally greater access overhead than the main storage. Therefore, if the processing system using the CS type instruction is as such replaced by the extended CS type instruction, develops the situation where the accesses to the extended storage occur frequently and the processing capacity of the system is not improved. In the first embodiment of the present invention, the second operand is made to be a greater area including the first double word of the second operand in the extended CS type instruction or to be a separate area (spaced-part area) from the first double word of the second operand so that great quantities of data other than the first double word of the second operand can be updated by one extended CS type instruction. Updating can be made, for example, in the unit of 4K or 8K bytes. Accordingly, the access frequency to the extended storage can be reduced and the drop of system performance can be prevented by judging the access competition by a plurality of processes from the value of the first double word of the second operand, storing various control data in the second operand and making updates by using one extended CS type instruction.

Hereinafter, the first embodiment of the present invention will be described with reference to the drawings. First of all, the specification of a CDSE (Compare Double and Swap Extended) instruction as an example of the extended CS type instruction will be described and then four examples of the methods of using it will be described. Among these four examples of using methods, the first is the mere replacement of the CS type instruction in the method used in the tightly coupled multiprocessor by the extended CS type instruction while the latter three examples are peculiar to the extended CS type instruction.

(1) Specification of Extended CS Type Instruction

FIG. 1 is a block diagram of a computer system representing the first embodiment of the present invention. FIG. 1 shows a multiprocessor system of the type wherein a plurality of data processing units 10 share an extended storage 40. Each data processing unit 10 includes a single or a plurality of instruction processors 20 and a main storage 30 shared by these instruction processors 20. Here, if a plurality of instruction processors exist, their data processing unit becomes a tightly coupled multiprocessor. Each data processing unit 10 may have its own exclusive extended storage 43 in addition to the common extended storage 40. Furthermore, each data processing unit 10 may have a common external storage 50 or an exclusive storage 51. In such a multiprocessor system, the data resource shared between a plurality of data processing units can be disposed in the common extended storage 40 or in the common external storage 50.

Figure 2:
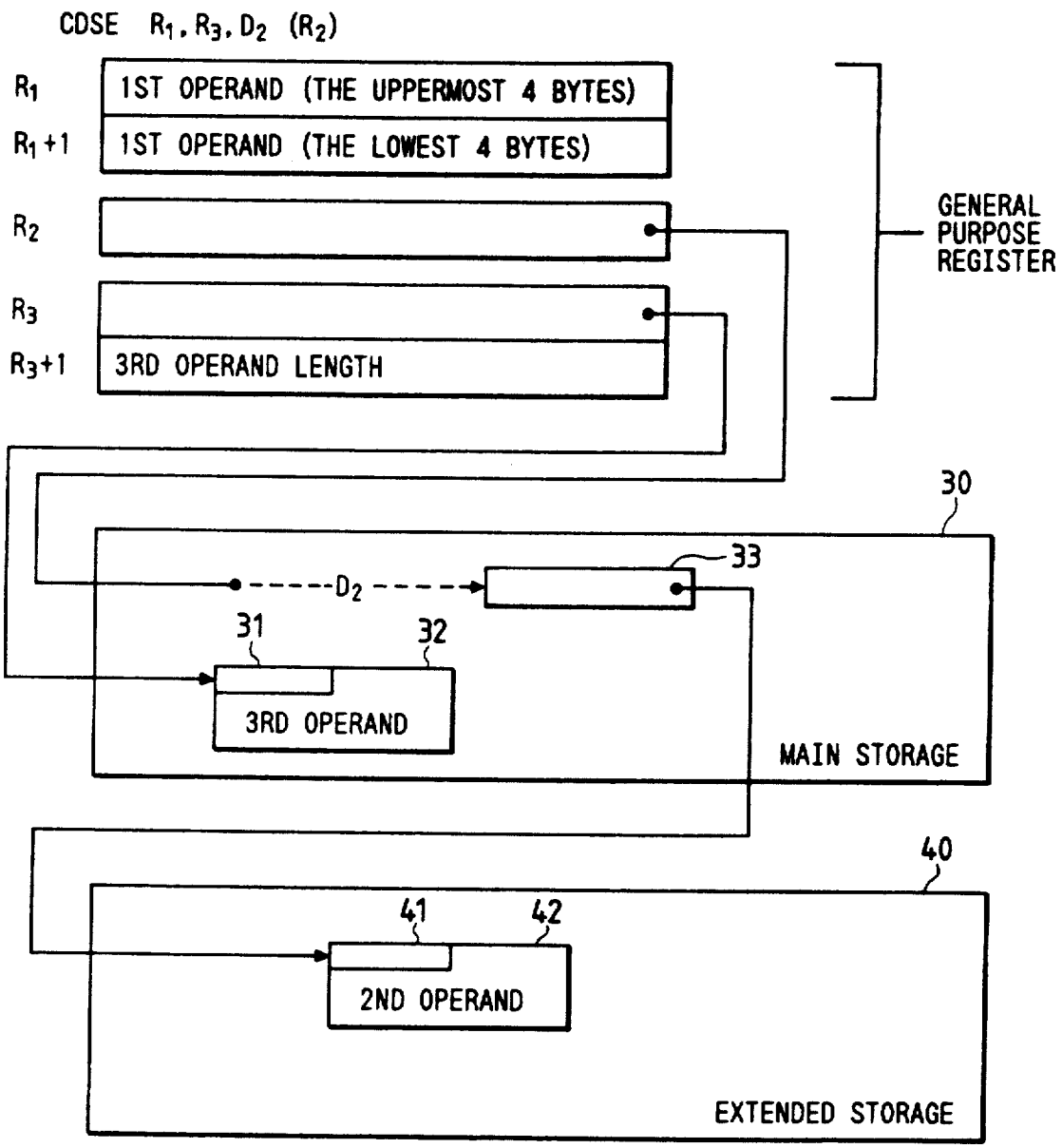
FIG. 2 is a block diagram showing the specification of a CDSE instruction.

The extended CS type instruction in the first embodiment of the present invention will be explained with reference to FIG. 2. The instruction has a format of CDSE $R_1$, $R_3$, $D_2(R_2)$. First of all, the data of the designated area on the common extended storage 40, that is, the data of the area 42 including the leading 8-byte area 41, are read (loaded) in advance into the area 32 including the leading 8-byte area 31 on the main storage 30 by the load instruction and the 8-byte data content of the area 41 (the identification information displaying the data of the area 42) is copied by the general purpose registers $R_1$ and $R_{1+1}$ and preserved as the first operand. Next, processing of the data loaded into the areas 31 and 32 is executed and the data of these areas 31 and 32 are replaced by the new data (third operand) obtained as the result of processing.

Next, the first operand of each general purpose register $R_1$ and $R_{1+1}$ is compared with the data of the area 41 (first double word of the second operand) and if they are coincident, the data of the area 42 (second operand, that is, the remaining data) including the area 41 (first double word of the second operand) is rewritten by the data of the area 32 (third operand) including the area 31. Here, the two continuous general purpose registers represented by $R_1$ and $R_{1+1}$ store the first operand of the 8-byte length (2 words) in total. $R_2-R_{3+1}$, too, are the registers on the instruction processors. The address of the area 42 on the extended storage as the second operand is stored in the area 33 on the main storage (virtual storage) having the leading address a designated by $R_2$ as the base register and $D_2$ as the displacement. The third operand 32 is stored in the area on the main storage (virtual storage) whose address is designated by $R_3$ and the third operand length is stored in the general purpose register designated by $R_{3+1}$. The third operand length can be designated in the 8-byte unit from 8 bytes to 4,096 bytes. The leading 8 bytes of the second operand on the extended storage is used as the first double word of the second operand 41 and if the instruction execution proves successful, they are replaced by the leading 8-byte area 31 of the third operand.

Figure 3:
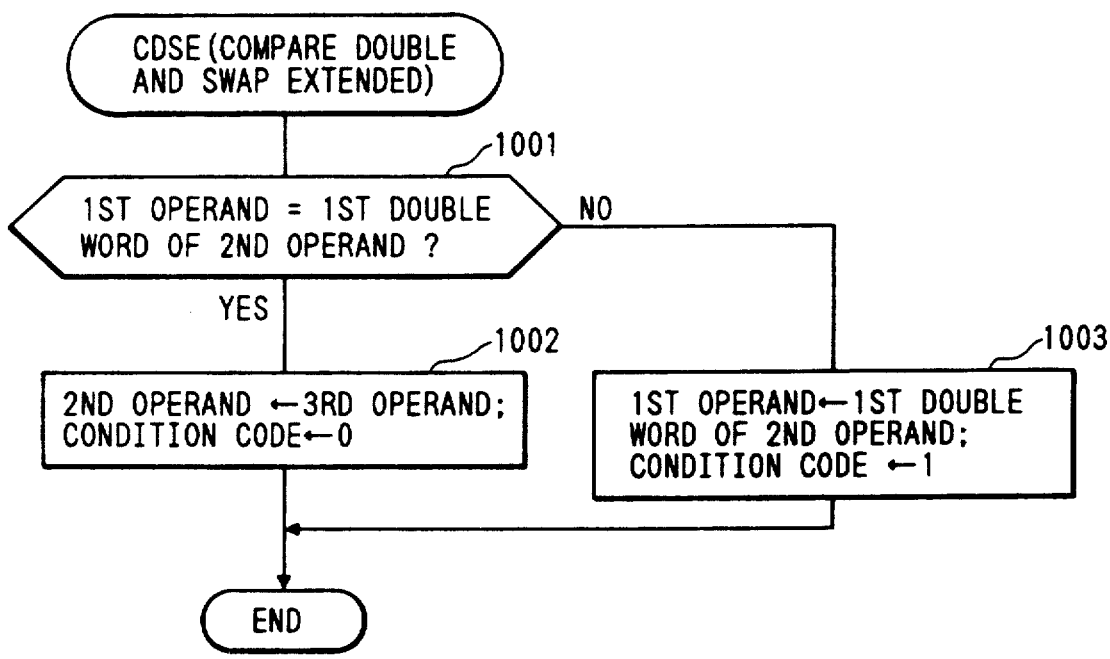
FIG. 3 is a flowchart showing the operation of the CDSE instruction.

The operation of the CDSE instruction will be explained with reference to FIG. 3. When this instruction is actuated, the content of the first double word of the second operand and that of the first operand are compared (step 1001). If they are found equal, the result is set to a condition code (e.g. "O"), and the access to the second operand from the others is inhibited till the end of the rewrite and the second operand is replaced by the third operand (step 1002). If they are not equal, the result is set to the condition code (e.g. "1") to notify that rewrite has already been made by the others and the content of the first double word of the second operand is loaded into the general purpose registers represented by $R_1$ and $R_{1+1}$ (step 1003). If another instruction processor attempts to gain access to the area on the extended storage including the first double word of the second operand while a certain instruction processor is executing the CDSE instruction, that access is kept under the stand-by state till the preceding CDSE instruction is complete. In other words, the area of the first double word of the second operand is locked hardware-wise during the CDSE instruction execution.

The data length of each of the first operand, the first double word of the second operand, the third operand and the second operand in the extended CS type instruction is not particularly limited to the length represented hereby. The designation method of these data is not particularly limited, either, to the method described above and the data may be designated in any way by use of the main storage or the registers. Though the second operand 42 is indirectly designated by the register $R_2$ through the area 33 of the main storage 30, it may be designated directly from the register $R_2$ (without passing through the area 33).

The first operand may be disposed on one area of the main storage. Modified types of the CDSE type instruction can include a command where the third operand length is fixed (the general purpose register $R_{3+1}$ is not necessary in this case), and an instruction which can designate variably at which position of the second operand the first double of the second operand exists (one more general purpose register or a parameter area on the main storage is used to represent the position of the second operand in this case). Furthermore, the instruction may be the one that does not use the first double word of the second operand as part of the second operand but can designate each of them independently (in such a case, too, one more general purpose register or the parameter area on the main storage is necessary in order to designate the first double word of the second operand). In this embodiment, some application examples of the use methods of the CDSE instruction will be described by use of the CDSE instruction, but the same can of course be attained by use of instructions of other types. such as the extended CS type and the like.

Ordinary data transfer instruction (MOVE, etc.) can of course exist as the access instruction to the extended storage besides the specific instruction such as the CDSE instruction. In the explanatory views that follow, the data transfer from the main storage to the extended storage will be represented by MOVE MS→ES and the data transfer from the extended storage to the main storage, by MOVE ES→MS.

(2) Lock/Unlock (Spin Type)

Figure 4:
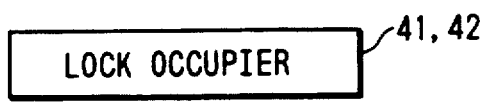
FIG. 4 shows the content of a second operand in the first example of use of the CDSE instruction.

The first use example of the CDSE instruction is the application to the spin type lock/unlock and this is a mere replacement of the use example of the CS type instruction in the tightly coupled multiprocessor by the CDSE instruction. In this use example, the first double word of the second operand 41 (=second operand 42, that is, the second operand 42 consists of the first double word of the second operand alone) is disposed on the common extended storage as the lock byte, as shown in FIG. 4. The content of the lock byte is not cleared to "O" when its lock byte is monopolized by a specific process and if the lock byte is monopolized, ID (identification data) of the monopolization process using the lock byte is set. Generally, the content of the lock byte may be arbitrary so long as it is possible to judge whether or not the lock byte is being now monopolized. The lock byte expresses logically the common data resource and how the lock monopolizing process can monopolistically gain access to the common data resource corresponding to the lock byte.

Figure 5:
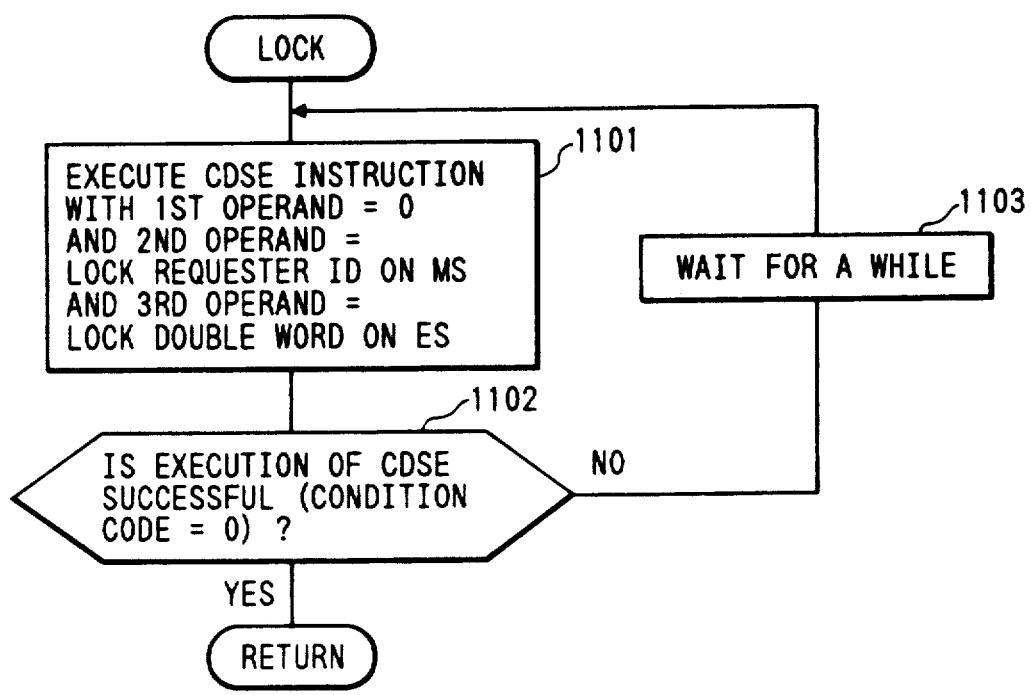
FIGS. 5 and 6 are flowcharts of lock processing of the spin type.

FIG. 5 shows the flow of the lock processing. In the lock processing, the CDSE instruction (whose detail is shown in FIG. 3) is executed by setting the first operand to 0, the third operand to ID of the lock request process and the lock byte on the extended storage to the first double word of the second operand (=second operand; step 1101) If the lock is not monopolized, the lock byte is 0 so that the first operand and the first double word of the second operand are coincident, the ID of the lock requesting process this time is set to the lock byte and the flow returns normally (step 1102). On the other hand, if the lock has already been monopolized by the other process, the ID of the monopolizer is set to the lock byte and the first operand ("0") and the first double word of the second operand (ID of the monopolizer) are not coincident. Accordingly, the CDSE instruction proves unsuccessful. In this case, the lock request is tried once again after a while (step 1103) This retrial is repeated until the CDSE instruction proves successful. The retrial may be effected instantaneously by skipping the step 1103. Incidentally, the explanation will be omitted about the access to the common data resource after the lock is reserved, and the like.

Figure 6:
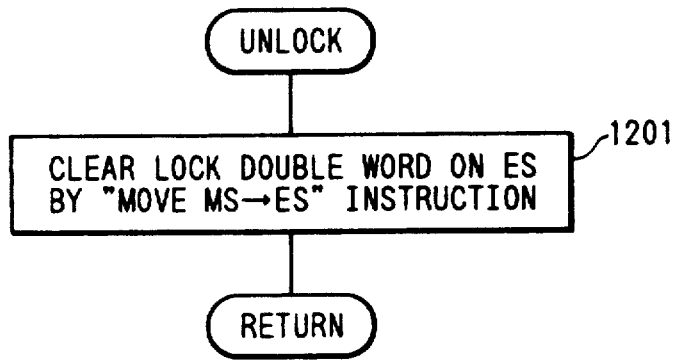

FIG. 6 is a flowchart of the unlock processing. In the unlock processing, the lock byte on the extended storage is cleared by the normal data transfer instruction from the main storage to the extended storage (step 1201). In the unlock processing, the requesting process has already monopolized the lock and hence, there is no possibility that the lock byte is updated by the other lock requesting processes. Accordingly, the lock byte may be cleared by the MOVE instruction but not by the CDSE instruction.

(3) Lock/Unlock (Suspend Type)

The second use example of the CDSE instruction is a suspend type lock/unlock processing. The difference between the spin type described above and the suspend type lies in that in the case of the lock of the suspend type, if the lock has been monopolized already by the other process, the lock request process is under the stand-by state till lock open communication is given from the lock monopolizing process. To accomplish the suspend type lock on the main storage, queues for the management of the lock byte and waite process are disposed on the main storage and the access is made independently to each of them by the CS type instruction and the other ordinary instructions, but if it is used as such for the extended storage access, the extended storage access overhead increases. For this reason, this use example disposes altogether the lock byte and the queue (sequence queue) in the second operand and are altogether updated by the CDSE instruction to reduce the number of times of the extended storage access.

Figure 7:
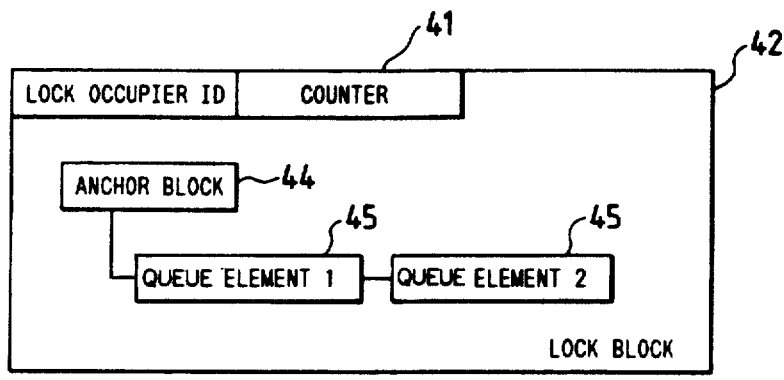
FIG. 7 shows the content of the second operand in the second example of use of the CDSE instruction.

FIG. 7 shows the content of the second operand on the common extended storage. Here, the second operand 42 will be referred to as a "lock block". The leading 8 bytes of the lock block consist of the lock bytes (upper 4 bytes) for holding the lock occupier ID and a counter (lower 4 bytes) for recording the number of times of updating for the lock block and are used as the first double word of the second operand. This counter is used in order to judge whether or not the updating of the lock block competes with the other processes (whether or not other processes are updating). The remaining area of the lock block is used for preparing the queue and contains an anchor block 44 and queue elements 45 of the queue. Here, the queue elements 1, 2, . . . are the queue of each instruction process. At the time of unlock, the lock occupier notifies the unlock to the leading element of the queue (queue element 1). This leading element becomes the next occupier and the content of the lock block 42 is altogether rewritten (the queue elements are subjected to sequential priority aging).

Figure 8:
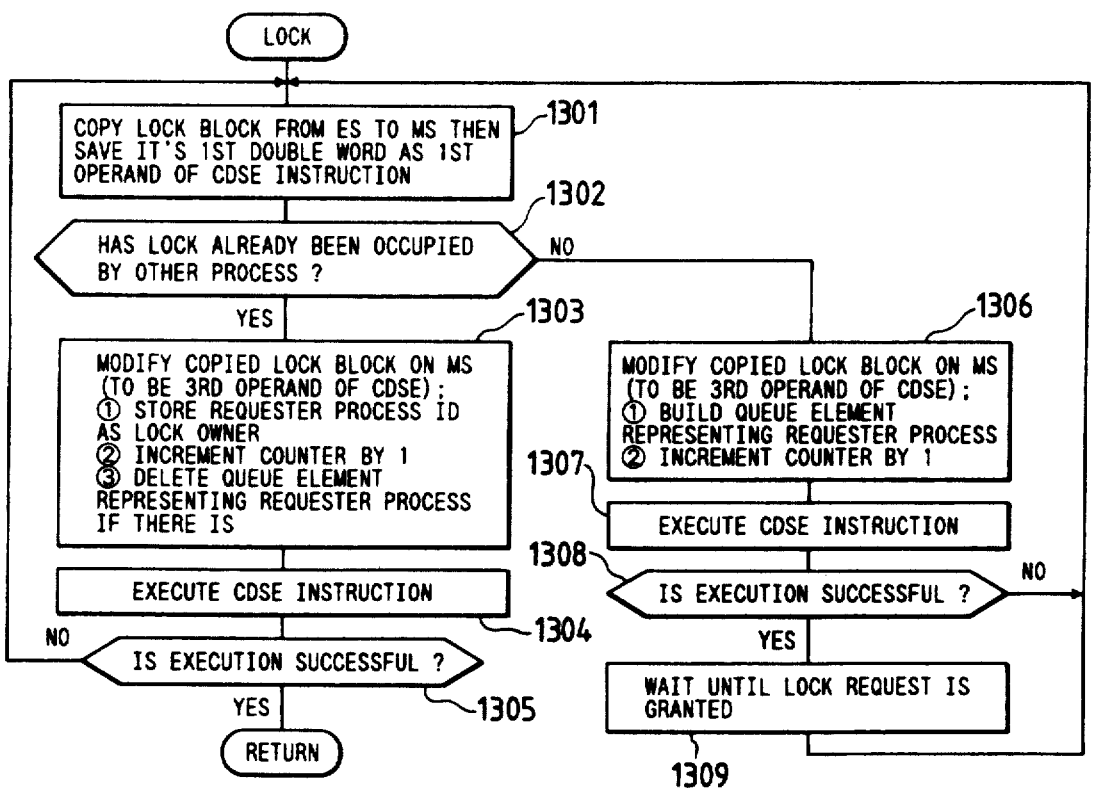
FIGS. 8 and 9 are flowcharts of a suspend type lock processing.

FIG. 8 is the flowchart of the lock processing. First of all, the lock block on the extended storage is transferred onto the main storage and its leading 8 bytes are loaded to the general purpose register and converted to the first operand (step 1301). The third operand is obtained by rewriting this lock block transferred onto the main storage. Whether or not the lock block is monopolized by the other process is judged by judging whether the lock byte is 0 (step 1302) and if it is not (lock byte 0), ID of its own process and the counter incremented by 1 are set to the leading 8 bytes of the lock block transferred previously to the main storage (step 1303) and the CDSE instruction (shown in detail in FIG. 3) is executed using them as the third operand (step 1304). If the counter value is the maximum value, it wraps around to 1.

If there is any queue element among the lock block that corresponds to its own process, it is deleted. This is necessary for the retrial of the lock processing after the later-appearing lock waite is released. If the CDSE instruction proves successful, it means that the lock can be secured, and the flow returns normally (step 1305). The reason why the CDSE instruction fails is that while two processes proceed substantially concurrently and the other process updates the lock byte as the first double word of the second operand or the counter (that is, the access competition occurs) during the period from the reference of its own process to the lock block at the step 1301 to the execution of the CDSE instruction at the step 1304. (In this case, even if the result of the comparison between the first operand and the first double word of the second operand at the step 1302 proves coincident, the result of the comparison at the step 1304 does not prove coincident.) Therefore, the retrial is made from the first step. If the other process is found to have already occupied the lock block at the step 1302, the queue element corresponding to its own process is prepared in the lock block and connected to a FIFO chain from the anchor block and the counter is incremented by 1 and used as the third operand (step 1306). The CDSE instruction is executed by use of this third operand (step 1307) and if the instruction proves successful, unlock communication from the lock occupier process is awaited (steps 1308, 1309). If the CDSE instruction of the step 1307 is unsuccessful, it is because the updating of the lock block is competing with the other process. Accordingly, the retrial of the lock processing is made.

Figure 9:
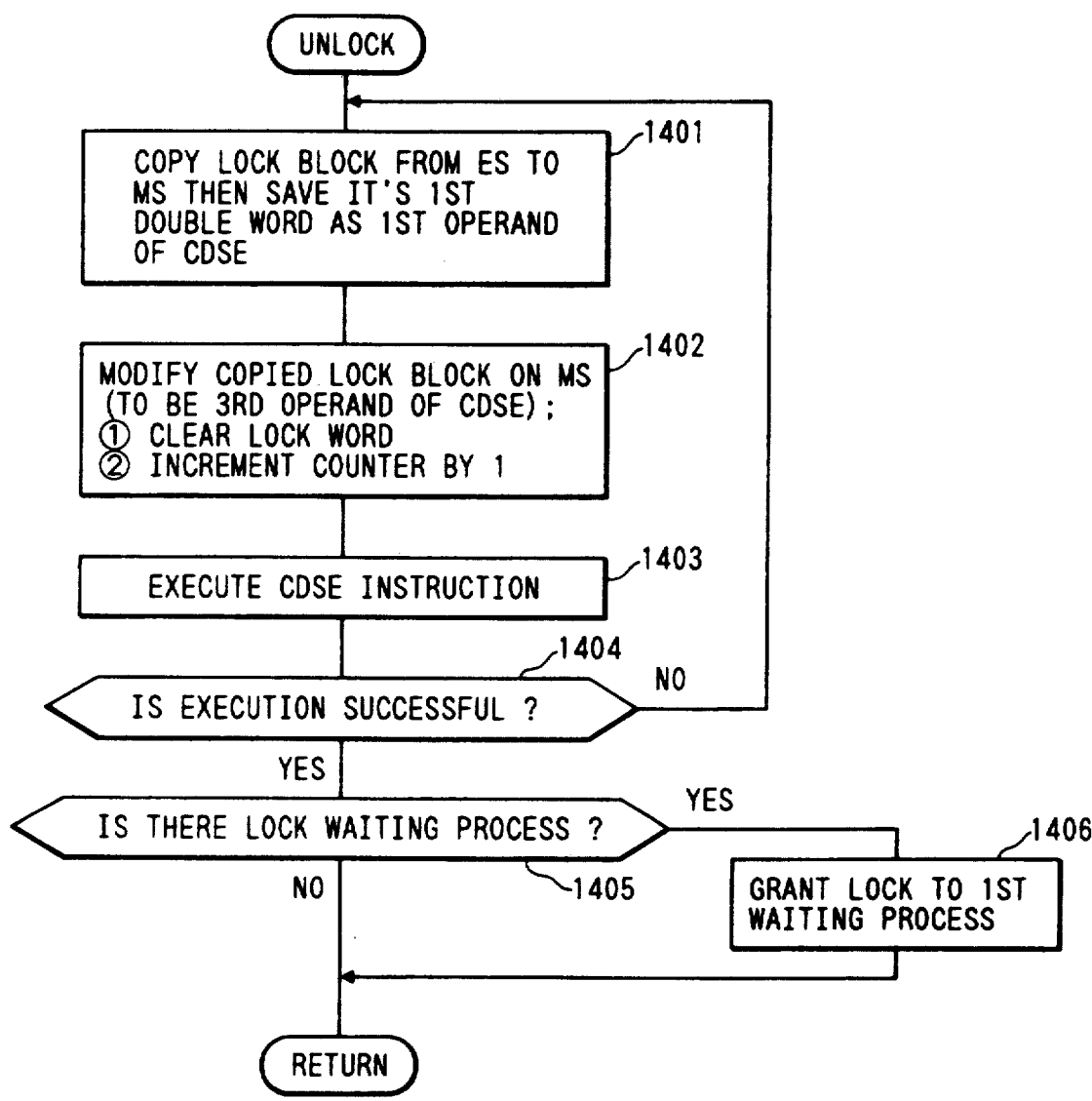

FIG. 9 is a flowchart of the unlock processing. In this unlock processing, the lock block is first transferred to the main storage and its leading 8 bytes are used as the first operand (step 1401). Next, the lock byte in the lock block transferred to the main block is cleared and used as the third operand (step 1402) and the CDSE instruction is executed (step 1403). If the instruction proves successful, whether or not the other lock waiting processing exist is examined by referring to the queue information in the lock block transferred to the main storage (step 1404, step 1405). If any lock waiting process or processes exist, the lock release is communicated to the process or processes (step 1406) and if it does not, the flow returns as such. Here, failure of unlock occurs in the case where the unlock processing by its own process and the lock processing by the other process proceed substantially simultaneously with each other. If the other process makes a lock attack and enters the queue during the period from the transfer of the lock block to the main storage at the step 1401 to the execution of the CDSE instruction at the step 1403 (this period can be regarded as the lock state by its own process when viewed from the other process; refer to steps 1308 and 1309 in FIG. 8), its own process fails to unlock (step 1405). On the contrary, however, if CDSE (step 1403) in the unlock processing of its own process is earlier than CDSE (step 1307) in the other process, the step 1308 (FIG. 8) proves unsuccessful and the step 1404 proves successful. Even if either of them fail, the unsuccessful step can correctly lock the state of the counterpart this time and the possibility of success becomes higher so that the failure does not continue for long. Incidentally, the release communication 1406 or the grant of lock described above is to release lock waiting generated at the step 1309 of FIG. 8 and any method can be used as the communication method so long as it makes the communication between the instruction processors possible. For example, it is possible to employ a method which uses a specific processing unit instruction for the generating an external interrupt for other data processing units, but such a communication method is not embraced within the constituent elements of the present invention.

(4) List Operation

If the access to the common data resource is made after each process secures lock by use of the lock/unlock function accomplished by the first and second embodiments, the accesses by a plurality of processes to the common data resource can be serialized. As to the common data having a relatively simple data structure, however, the accesses can be managed by a method having a further lower overhead. The common list processing which will be described as the third use example is one example of such methods.

Figure 10:
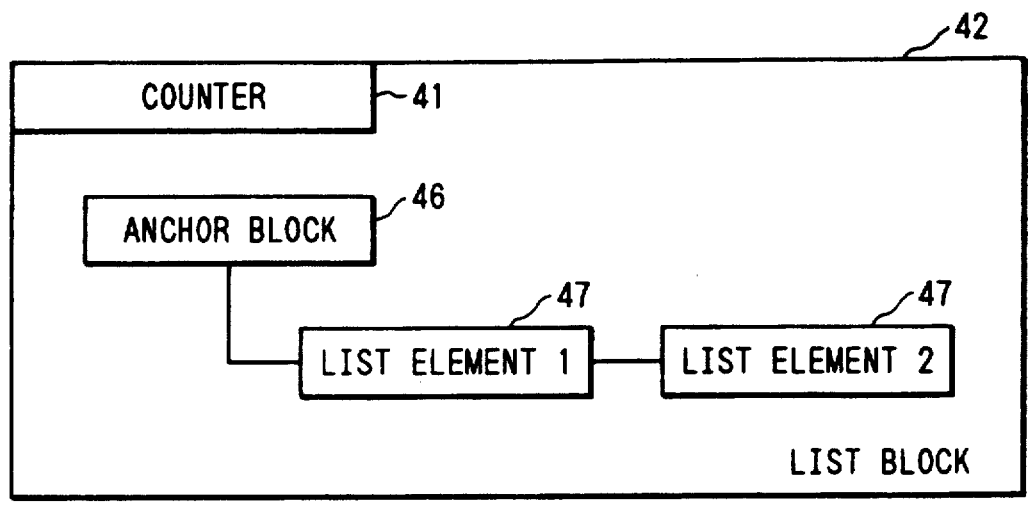
FIG. 10 shows the content of the second operand in the third example of use of the CDSE command.

FIG. 10 shows the second operand on the common extended storage in this use example. The second operand 42 is hereby referred to as the list block and contains the anchor block 46 and list elements 47 of the list. The leading 8 bytes of the list block are used as update counter and becomes the first double word of the second operand 41. This counter is used in order to detect whether or not the access to the list block competes with the other processes. This use example deals with the case where one list is closed inside one list block (maximum 4,096 bytes). The operations for the list include retrieval of the list elements, updating, addition and deletion, and they will be sequentially described next.

Figure 11:
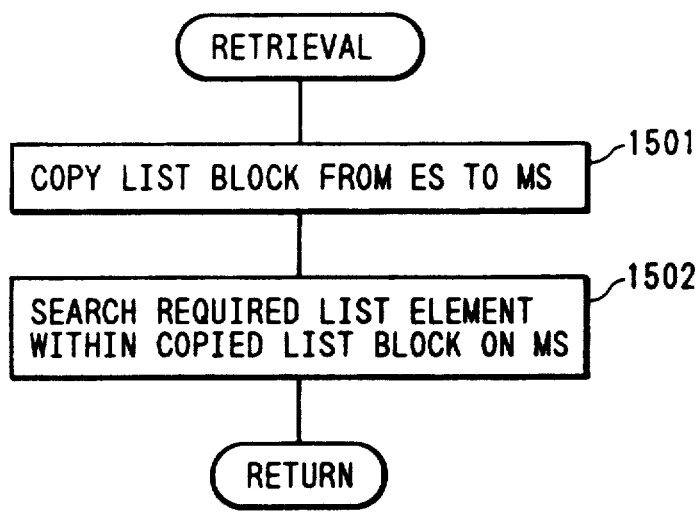
FIGS. 11 and 12 are flowcharts of list processing.

FIG. 11 shows the flow of the retrieving processing of the list elements. The retrieving processing transfers the list block containing the object list to the main storage (step 1501) and retrieves the object list element by following the pointer chain from the anchor block 46 (step 1502). Any methods can be used as the designation method of the object list element such as the one using the data key, the one using the position in the list, and the like, so long as they can determine primarily the list elements. The CDSE instruction is not used in the retrieving processing, but is shown in the drawing in order to describe completely the list processing as a whole.

Figure 12:
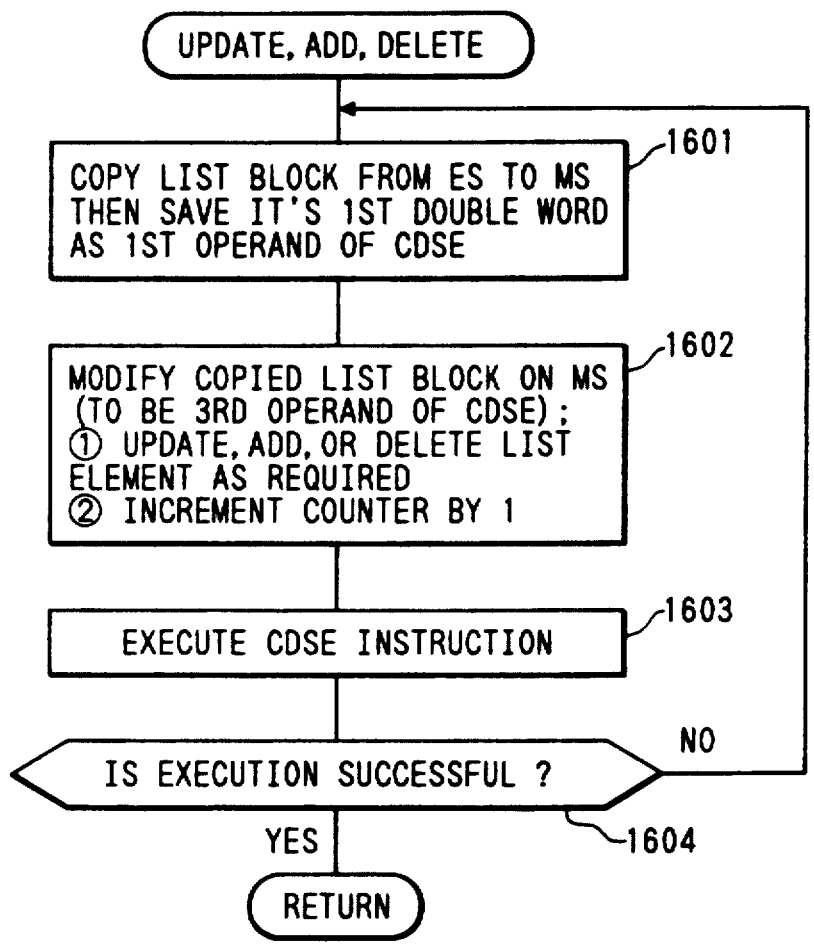

FIG. 12 shows together the flow of the updating, addition and deletion processings. First of all, the list block is transferred to the main storage and its leading 8 bytes are converted to the first operand (step 1601). Then, updating, addition and deletion of the list elements are conducted on the main storage and at the same time, the counter value is incremented by one (step 1602). The list block that has thus been modified on the main storage is used as the third operand and the CDSE instruction is executed (step 1603). If the instruction execution proves successful, the flow returns normally (step 1604). If the CDSE instruction proves unsuccessful, it is because the updating of the list block competes with the other process. (When competion occurs, the count is moved up by the other processes during the steps 1601 to 1603 and thus the execution fails.) In this case, retrial is made from the transfer of the list block to the main storage.

Since the shared list elements in one list block can thus be operated without using the lock/unlock function, system control information shared between a plurality of data processing units can be managed efficiently. The operation of a fixed table corresponds to the case where only one list element always exists in this list processing.

(5) Hash Table Operation

As the fourth example of the CDSE instruction, a hash table operation will be cited. The hash table operation is one of the fundamental data processings in the same way as the list operation described in the third use example, and many functions can be accomplished by applying both of them.

Figure 13:
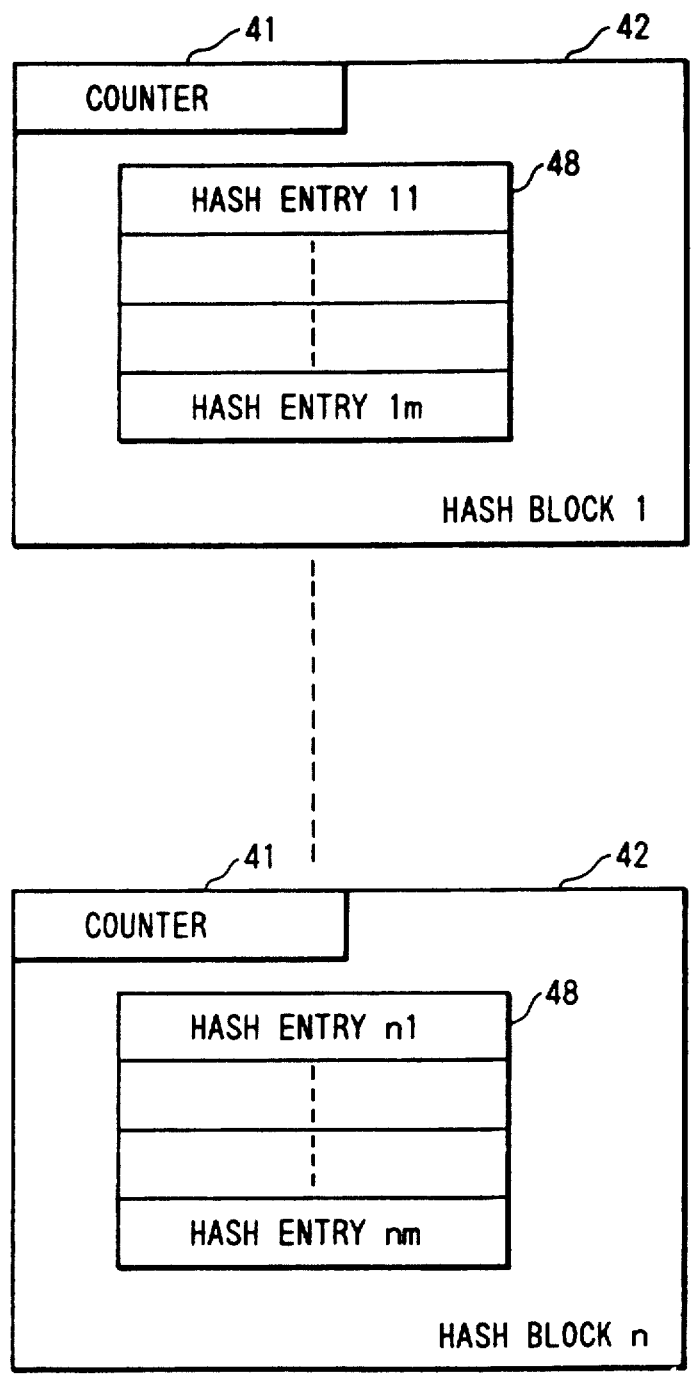
FIG. 13 shows the content of the second operand in the fourth example of use of the CDSE instruction.

FIG. 13 shows the format of the second operand in this use example. Here, the second operand 42 is referred to as the "hash block" and a plurality of such hash blocks are prepared on the common extended storage and identified by the block number. Each hash block contains a plurality of hash entries 48 and its leading 8 bytes are used as the updating counter. In the same way as the other use examples, this counter is for detecting the competition of the accesses to the hash block. The element operation for the hash table is the same as that for the list and consists of retrieval, updating, addition and deletion of the hash entries.

Figure 14:
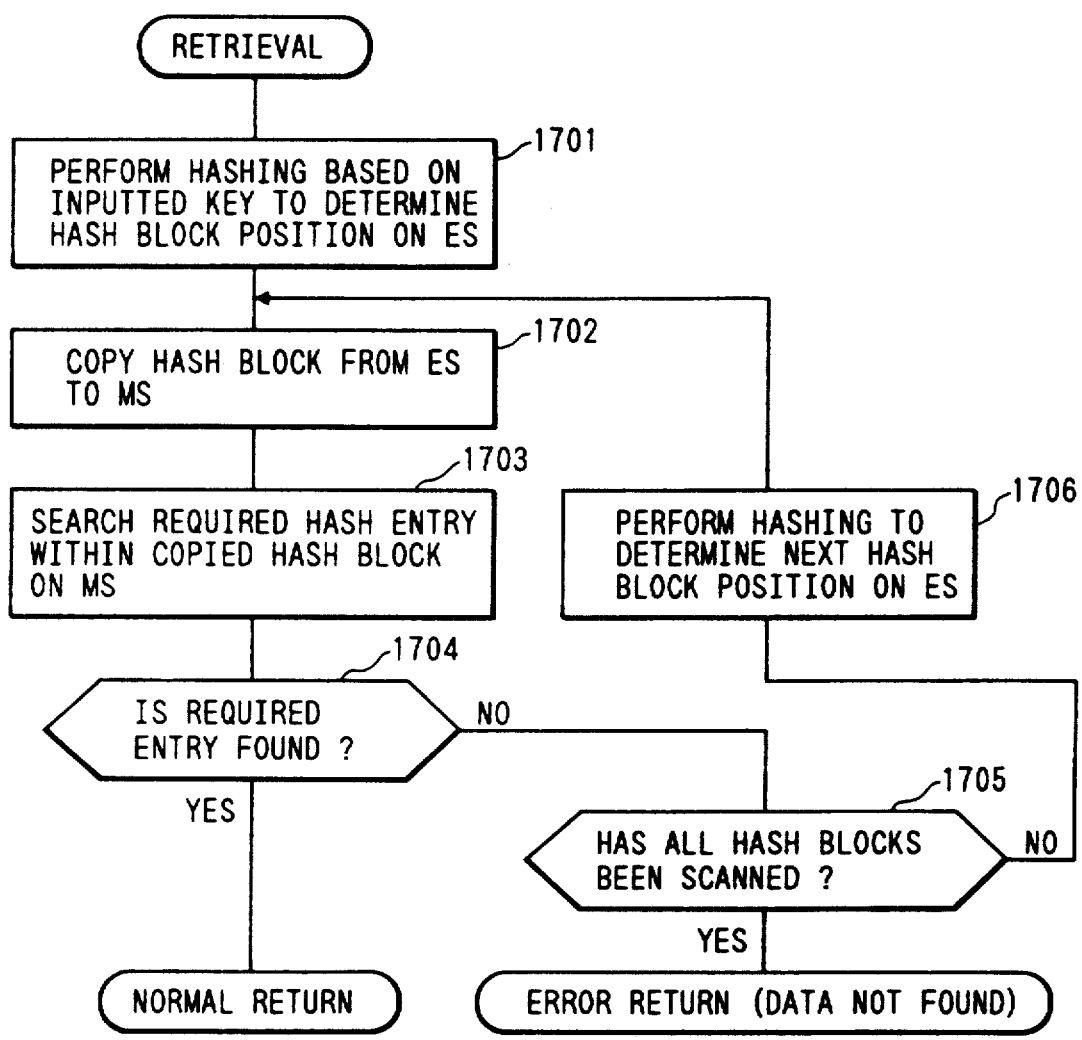
FIGS. 14 to 16 are flowcharts of the hash table processing.

FIG. 14 shows the flow of the retrieving processing of the hash entry. Here, the CDSE instruction is not used in the same way as the retrieving processing of the list elements described above but the explanation will be made in order to complete the description of the hash table operation. Retrieval is requested by designating the key of the object hash entry. In the hash processing, the block number of the hash block is first searched by hashing the designated key (step 1701). An arbitrary hash function may be used in accordance with a definite application. The hash block having the block number thus determined is transferred to the main storage (step 1702) and the hash entry in the hash block is retrieved (step 1703). If the object hash entry is found out, the flow returns normally (step 1704). The retrieval method of the hash entries in the hash block to be executed at the step 1703 may be arbitrary, such as sequential retrieval from the leading part and retrieval by re-hashing inside the hash block. If the object hash entry does not exist in the hash block (or in other words, if collision of hasing occurs), the next candidate hash block is determined (step 1706) to continue hashing. If the object hash block cannot be found out even after all the hash blocks are retrieved, error return is made (step 1705). An arbitrary algorithm can be used as the retrieval algorithm at the time of occurrence of collision of hashing so long as it does not use a synonym pointer bridging between different hash blocks. Here, the term "synonym pointer" is the pointer chain set between the hash entries having the same hash value, which can be set so long as it is set between the hash entries of the same hash block.

Figure 15:
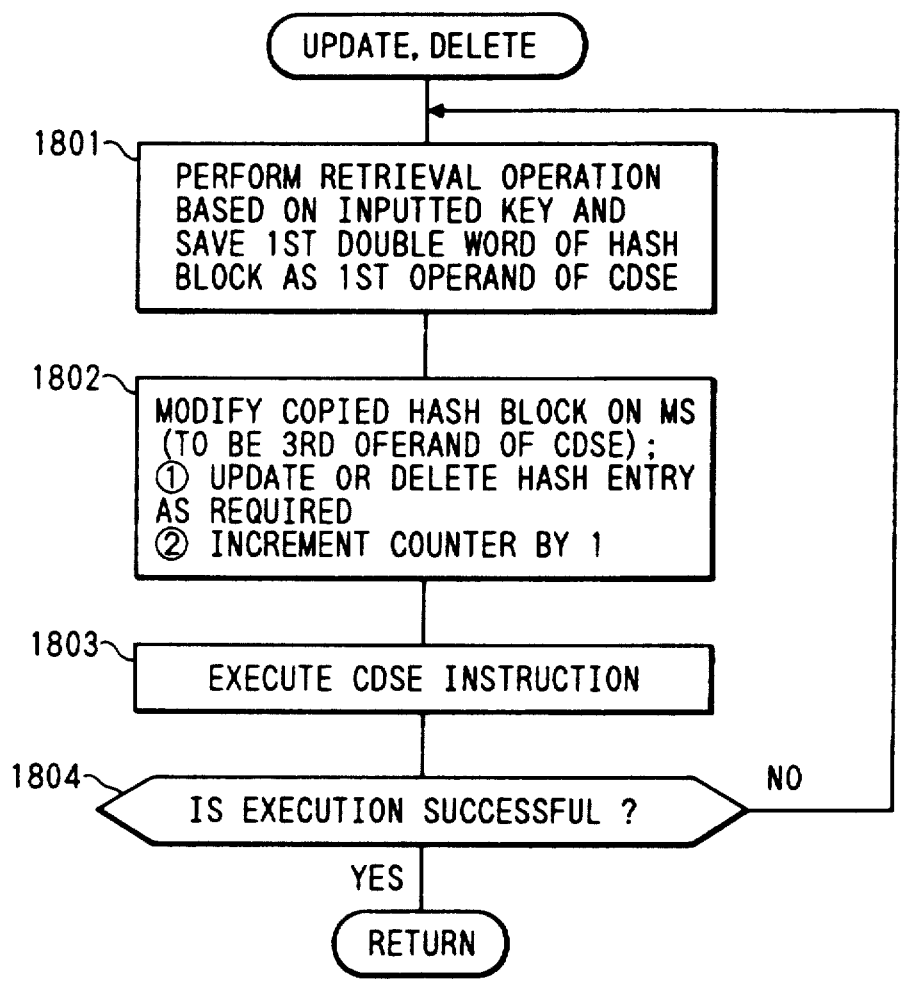

FIG. 15 shows the flow of updating and deletion processings of the hash entries. First of all, the hash block containing the object hash entry is transferred to the main storage by making the retrieving processing and its leading counter value is used as the first operand (step 1801). Next, the hash entries in the transferred hash block on the main storage are updated or deleted and at the same time, the leading counter of the hash block is incremented by 1 (step 1802) so as to execute the CDSE instruction by use of the incremented value as the third operand (step 1803). The flow returns normally if the instruction is successful (step 1804) and if not, retrial is made from the retrieving processing because updating on the extended storage of this hash block competes with other processes.

Figure 16:
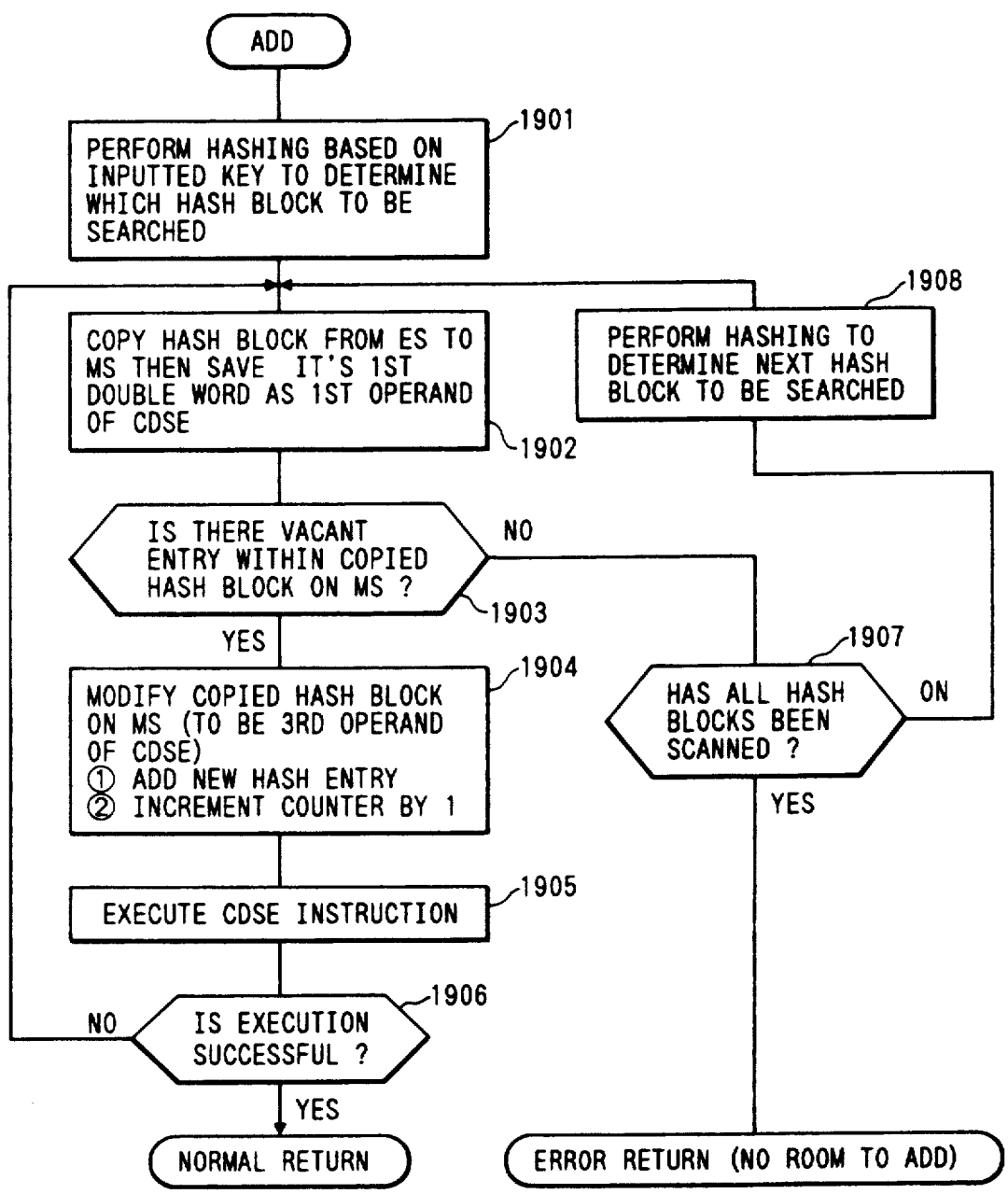

FIG. 16 shows the flow after the addition processing of the hash entry. The hash processing similar to the retrieving processing is executed at the steps 1901-1903 and steps 1907-1908 but an empty hash entry is hereby searched but not retrieval of a hash entry having the designated key. If the empty hash entry is found out, the additional data is put into the hash entry in the hash block transferred to the main storage and at the same time, the counter value is incremented by 1 (step 1904). Using this as the third operand and the counter value before incrementation as the first operand, the CDSE instruction is executed (step 1905) and the flow returns normally if the instruction is successful (step 1906). If the CDSE instruction fails, retrial is made from the retrieval of the empty entry because updating of the hash block on the extended storage competes with other processes.

The second to fourth use examples described above represent the example which use part of the second operand for detecting the competition of the accesses with other processes, dispose various control data in the remaining area of the second operand and update them together by the CDSE instruction so as to manage the control data while keeping their coordination. However, it is to be noted that this system does not depend on the data format and content of the control data and can handle arbitrary data.

As described above in detail, the composite data processor and management method of the common data resource of the first embodiment of the present invention dispose the extended storage shared by a plurality of data processing units and employs the extended CS instruction for executing the operations from the data reference (comparison) to the rewrite relating to the specified area on the common extended storage as the inseparable operation which the other processes cannot come into. Accordingly, the first embodiment of the invention can accomplish a multiprocessor system of an intermediate type between the so-called tightly coupled multiprocessor and the loosely coupled multiprocessor, can manage flexibly and efficiently the data resource on the extended storage and can eventually accomplish a multiprocessor system sharing the extended storage with a reduced overhead.

SECOND EMBODIMENT

A method which exchanges control information as the message in order to manage the common data resource involves the problem that a large overhead is necessary for the transmission/reception processing for composing various control information messages. In contrast, the extended storage is a memory device to which synchronous access can be made at a high speed from instruction processors in the same way as the main storage, and the operation of the control information disposed on the extended storage can be executed at a high speed and easily. On the other hand, the access overhead for the shared extended storage is by far smaller than that for the secondary storage but is somewhat greater than that for the main storage. Whereas the main storage access can be made freely in the bit, byte or word unit, a extended storage access can be made only in the block unit. Therefore, there is the possibility that the extended storage access overhead becomes high and efficient data management cannot be made if the control table of a lock manager disposed on the main storage in the single multiprocessor environment on the common extended storage and the lock managers on a plurality of data processing units use the control table.

The second embodiment of the present invention clusters the common data resource, disposes exclusive control information (local lock management table) relating to the individual data resource on the main storage so as to make fine exclusive control (local lock), handles the clustered data resources as a cluster, holds only the information corresponding to the cluster (global lock management table) and makes less coarse exclusive control (global lock) to restrict the unnecessary increase of the accesses to the extended storage. Accordingly, it is only necessary for the lock manager of each data processing unit to gain access to the local lock management table on the main storage of its own data processing unit and to the local lock management table on the extended storage. Communication between the data processing units is made only when waiting of the global lock occurs, and the communication overhead can thus be reduced drastically.

Hereafter, the second embodiment of the present invention will be described in further detail with reference to the drawings.

In a loosely coupled multiprocessor sharing an extended storage and a secondary storage, the second embodiment of the present invention provides a control method which controls the access to the common data resource. In this second embodiment, the mechanism of the lock managers for effecting exclusive control between a plurality of data processing units will be shown and the processing when various troubles occur in the system will also be illustrated.

Figure 17:
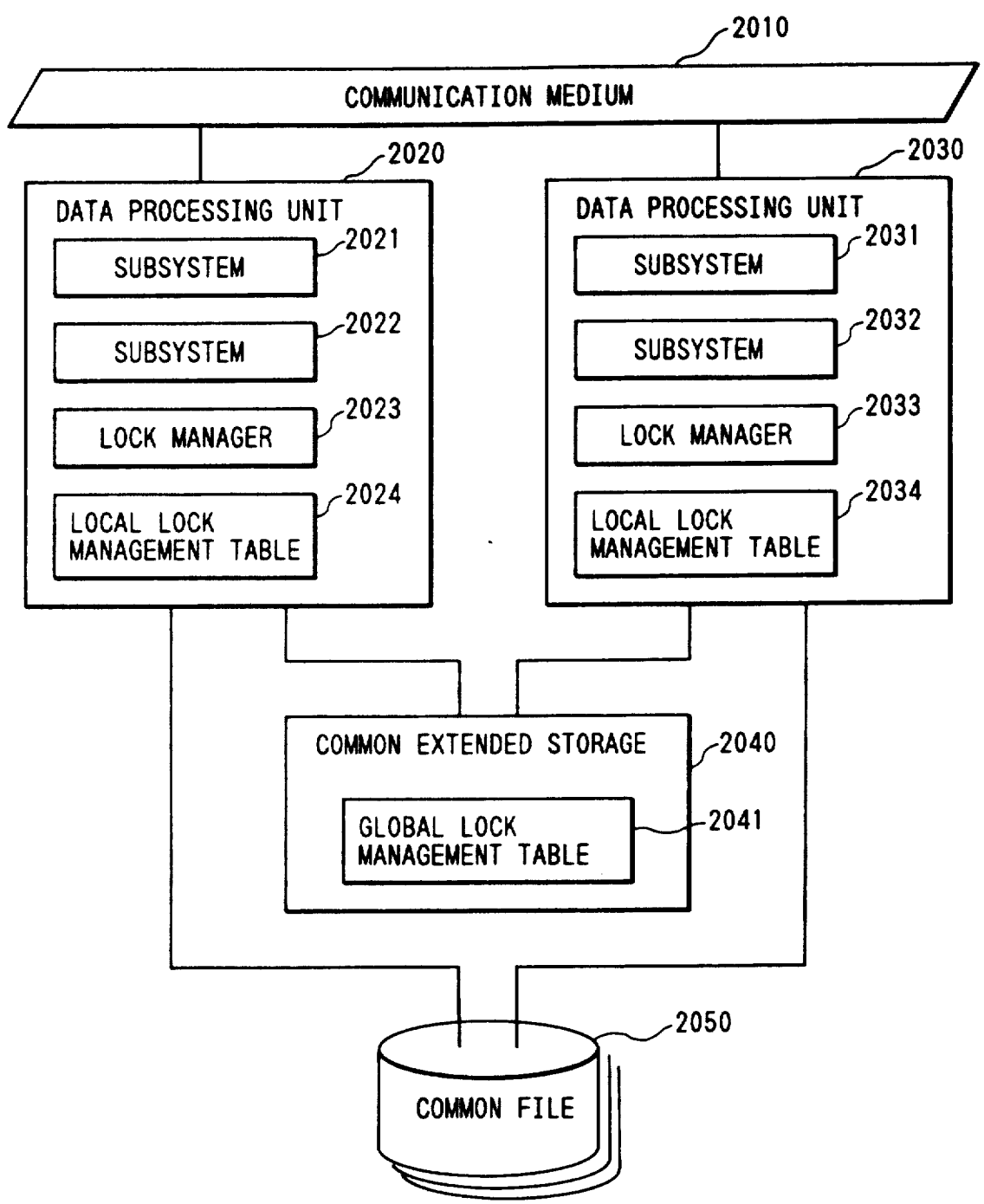
FIG. 17 is a block diagram of a computer system showing the second embodiment of the present invention.

FIG. 17 shows a block diagram of the computer system of the second embodiment of the present invention. FIG. 17 shows the case where a plurality of data processing units 2020 and 2030 coupled by a communication medium 2010 share an extended storage 2040 and a common file 2050. Each data processing unit includes subsystems 2021-2022, 2031-2032 for gaining access to the common data resource, lock mangers 2023 and 2033 and local lock management tables 2024 and 2034. A global lock management table 2041 is dispose don the common extended storage 2040. The contents and using methods of the local lock management table and global lock management table will be described later. The common data source is held on the common extended storage 2040 or on the common file 2050. Though FIG. 17 shows a system configuration consisting of two data processing units and four subsystems, a greater number of data processing units and a further greater (or smaller) number of subsystems can be used. Each data processing unit may be equipped with an extended storage and a file that are not shared. The data source that is not shared is disposed between these extended storages. In this embodiment, the communication medium 2010 need not be a complicated apparatus capable of transmitting arbitrary data but may be of such a type that can communicate simple codes with the other data processing units. If a mail box between data processing units is disposed on the common extended storage 2040 and a message is stored there, arbitrary data can be exchanged between the data processing units by use of only such a simple communication apparatus.

The lock managers and 2023 and 2033 are disposed so as to correspond to the data processing unit on the 1:1 basis, accepts the lock request and unlock request from the subsystems 2021 and 2022 (2031 and 2032) operating on its own data processing unit and makes exclusive control by operating the local lock management table 2024 (2034) held on the main storage of its own data processing unit and the global lock management table 2041 held on the common extended storage. A transaction executed under the management of each subsystem issues actually the lock request and the unlock request to the lock manager. Each transaction issues the lock request for the lock manager before using the common data resource and when the lock is secured, it gains access to the data resource. When utilization of the data resource becomes unnecessary, each transaction issues the unlock request and gives up the use right of the data.

A unique identifier is applied to each of the data processing units, subsystems and common data source inside the system. A unique identifier is also applied to each transaction operating under the management of the subsystem, and when this identifier is combined with the identifier of the subsystem or when the unique identifiers inside the system are combined, a unique identifier can be constituted inside the system. The reason why the unique identifier, which is not unique inside the data processing unit but is unique inside the whole system, is given to the subsystem is that there is the possibility that the subsystem is executed on a plurality of data processing units. (Needless to say, it is executed simultaneously only on one data processing unit.) Such a case can occur, for example, when a certain data processing unit is out of order and the subsystem executed by the data processing unit is then executed by a spare data processing unit.

Figure 18:
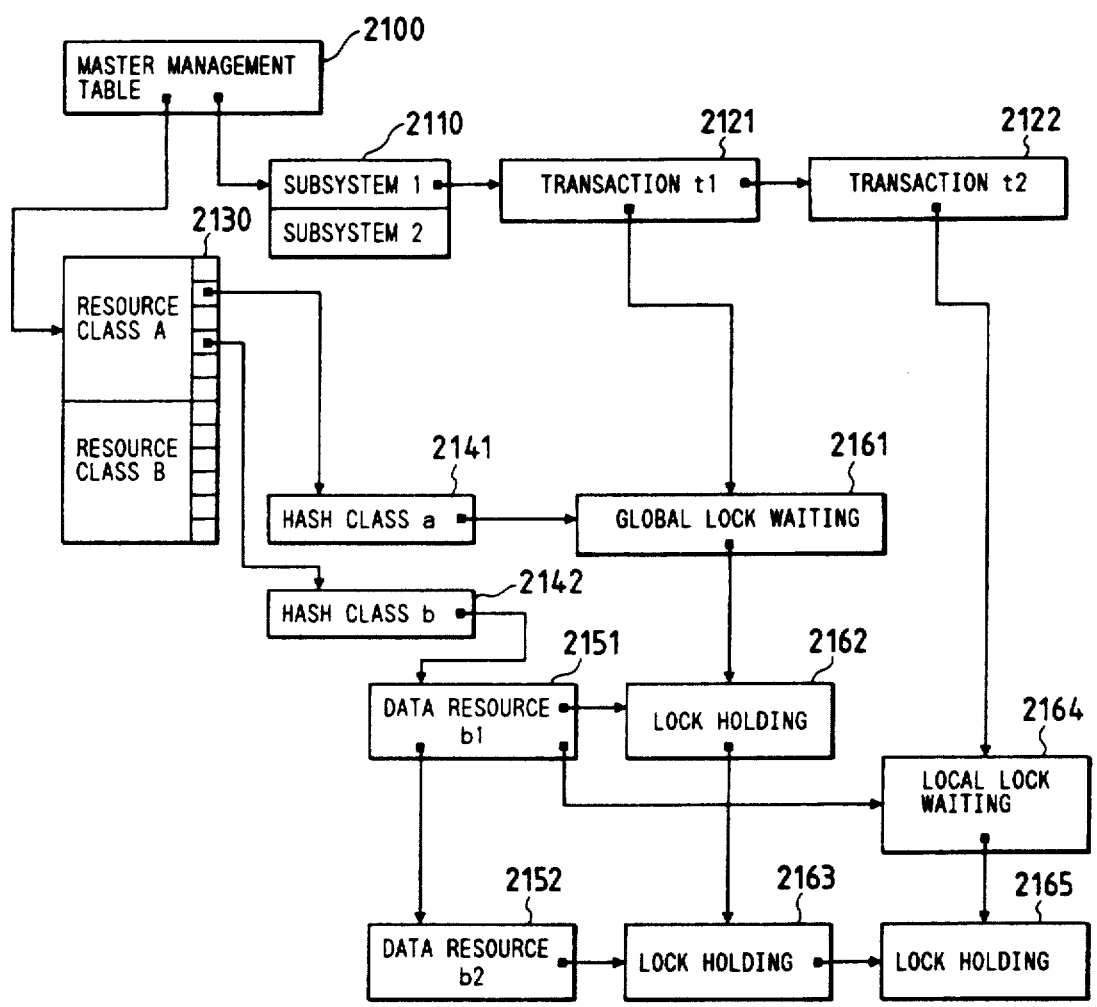
FIG. 18 shows a local lock management table.

FIG. 18 shows the content of the local lock management table 2024 (2034). A master management table 2100 is a table which becomes an anchor when each table is retrieved, and is disposed for each lock manager on the 1:1 basis. A subsystem table 2110 expresses the subsystem operating on its own data processing unit and is pointed by the master management table. The transaction operating under the management of each subsystem is expressed by the transaction table 2121 and 2122. The transaction table is connected to the pointer chain from the subsystem table.

The common data resource is clustered into two stages. In the first clustering, a user provides a classification standard by system definition in accordance with the operational characteristics of the data resource and a resource class table 2130 is set so as to correspond to each cluster (hereinafter referred to as a "resource class"). The second clustering is made by hashing by use of the resource name as a key and the data resource having the same hash value becomes one cluster (hereinafter referred to as a "hash class") and is expressed on the hash class tables 2141 and 2142.

The resource class table is pointed from the master management table 2100 and the hash class table is pointed by one of the pointer arrays inside the resource class table 2130. The individual command data resource is expressed by the data resources tables 2151-2152. This resource table is connected to the pointer chain from the hash class table to which it belongs. Clustering is made into a plurality of stages because it is more convenient for the operation of a large capacity common data resource. If clustering is only one by hashing, the data resource disposed on the individual file, for example, is clustered into the same hash class and if the operation in the hash class unit is made, there is the possibility that unnecessary interference between the files occurs. Such a side effect can be eliminated by use of a hash function to which specific contrivance is made, but can be accomplished more naturally by multistage clustering.

The lock request from each transaction is represented by the lock table 2161-2165. Here, the lock table has three states in accordance with the processing condition of the lock request. The first state is "locking holding" and this represents that the transaction secures the lock to the data resource. The lock table under this state is connected to the lock holding chain from the resource table. The second state is "local lock waiting" and this represents that unlock of other transactions inside its own data processing units is waited for. The lock table under this state is connected to the local lock waiting chain from the resource table. The third state is "global lock waiting" and this represents that unlock of the transactions on other data processing units is waited for. The lock table under this state is connected to the global lock waiting chain from the hash class table. That a certain transaction secures a plurality of locks is expressed by the lock table connected to the pointer chain from the transaction table. FIG. 18 shows the case where the transaction t1 issues the lock request represented by the lock tables 2161, 2162, 2163 and the transaction t2 issues the lock request represented by the lock tables 2164 and 2165. Here, the lock tables 2162, 2163, 2165 are under the "lock holding state", the lock table 2164 is under the "local lock waiting" state and the lock table 2161 is under the "global lock waiting" state.

Reservation of the lock for the common data resource is carried out by two stages of procedures, that is, reservation of the global lock and reservation of the local lock. The global lock is the lock for making exclusive control between a plurality of data processing units and the lock is given in the hash class unit to the data processing unit. In contrast, the local lock is the lock for making exclusive control between a plurality of transactions inside one data processing unit and the lock is given in the individual source unit to the transaction. To reserve the lock for the common resource, the global lock of the hash class to which the resource of the object lock is first reserved in its own data processing unit and then the local lock of that resource is reserved from its own transaction. If its own data processing unit has already reserved the global lock of the lock object hash class, it is not necessary to reserve afresh the global lock and only reservation of the local lock may be executed.

Figure 19:
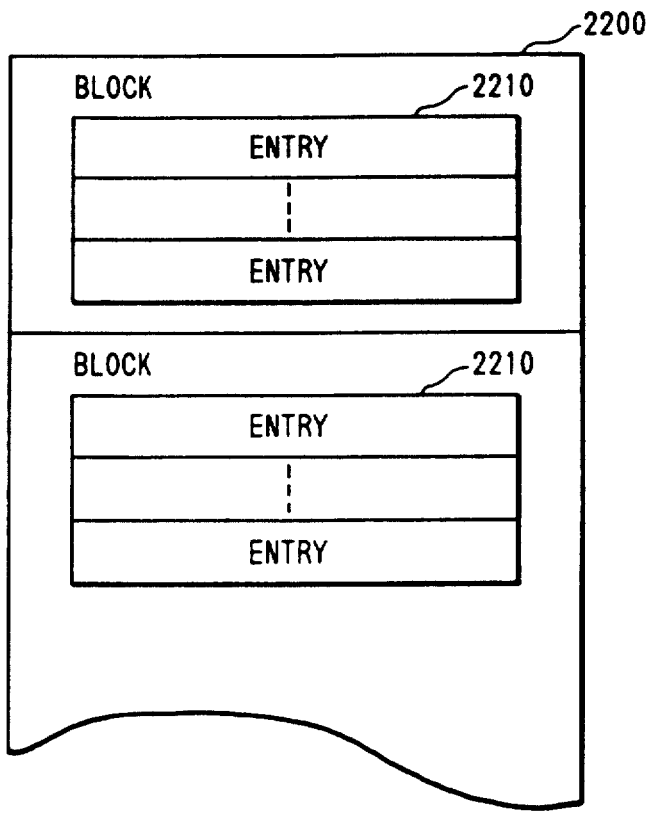
FIG. 19 shows a global lock management table.

FIG. 19 shows the global lock management table held on the common extended storage. The extended storage can be directly written from each data processing unit by the processing unit instruction which executes the data transfer between the main storage and the extended storage, and its data transfer is made in the block unit (with the block size depending on the individual hardware specification). The access to the extended storage is slower than the access to the main storage but is by far faster than the access to a secondary storage (e.g. magnetic disk device). Accordingly, if the global lock management table is designed in the same way as the local lock management table on the main storage and frequent accesses are made thereto, overall system performance is likely to drop. In this embodiment, the global lock management table has a simple arrangement structure not having the pointer chain and the increase in the unnecessary accesses to the extended storage is prevented by disposing entries in such a manner as to correspond to the clustered data resources (hash classes).

Figure 20:
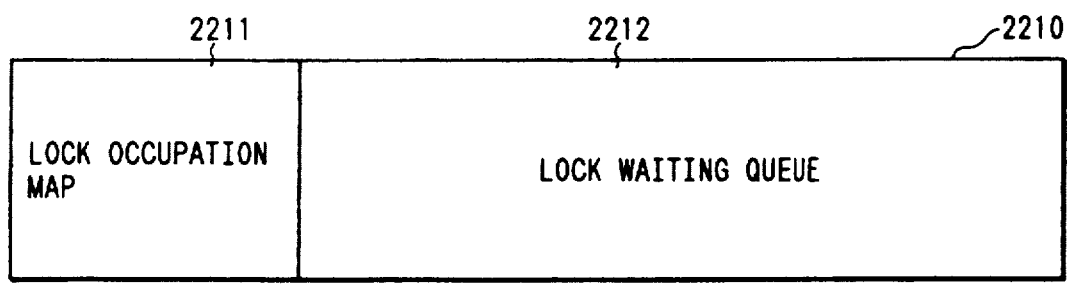
FIG. 20 shows global lock management table entry in the second embodiment of the present invention.

A plurality of global lock management table entries 2210 are disposed in one block 2200 of the extended storage. These global lock management table entries are aligned in the sequence of the hash values of the corresponding hash classes. Each lock manager has a correspondence table between the hash class and the extended storage block on the main storage of its own data processing unit, determines the address of the block containing the intended global lock management table entry by use of the table and transfers that block to the main storage. As shown in FIG. 20, each global lock management table entry 2210 includes a) a lock occupation map field 2211 representing which data processing unit holds the lock of which mode as to the corresponding hash class, and b) a field 2212 for preparing the queue of the data processing unit waiting for the global lock reservation. This queue is expressed by the pair arrangement of the field representing the lock requesting data processing unit and the field representing the requested lock mode. Besides the contents shown in this embodiment, any contents may be used as the contents of the global lock table entry so long as they can express the occupation and reservation of the global lock.

FIG. 21 shows compatibility of the lock modes in this embodiment. Here, the term "compatibility of lock modes" means whether or not the two locks requested from different transactions to the same lock object are simultaneously permissible. If the two locks are not compatible, the lock request issued later is caused to wait. In FIG. 21, circle O represents that two lock modes are compatible (that is, simultaneous lock permission is permissible) and X represents that two lock modes are contradictory (that is, simultaneous lock permission is not possible). FIG. 22 shows an inclusiveness table of the lock modes. Here, the term "inclusiveness" between the two lock modes represents whether or not the access right to the right permitted in one of the lock modes is included in the access right permitted in the other lock mode. If a transaction that has already reserved a certain data source raises again the lock request for the same data source, the new lock request is immediately permitted if the mode of the newly requested lock is included in the mode of the lock that has already been reserved but if not, the new lock request is rejected. In the latter case, the lock manager either cancels the new lock request or tries a lock reservation processing of a mode that contains both the lock that has already been reserved and the newly requested lock. In FIG. 22, symbol O represents that the inclusiveness relation of the lock modes is established and symbol X does that such a relation is not established. Here, lock modes other than the lock modes hereby represented may be used, and it is possible to employ a separate lock mode system of the local locks and the global locks within the range where no contradication is generated.

Hereinafter, the lock processing and the unlock processing will be explained in detail with reference to the flowcharts. In the description of the flowcharts, fine exceptional processings will be omitted in order to prevent the description from becoming unnecessarily complicated.

(1 - 1) Local Lock Reservation

Figure 27:
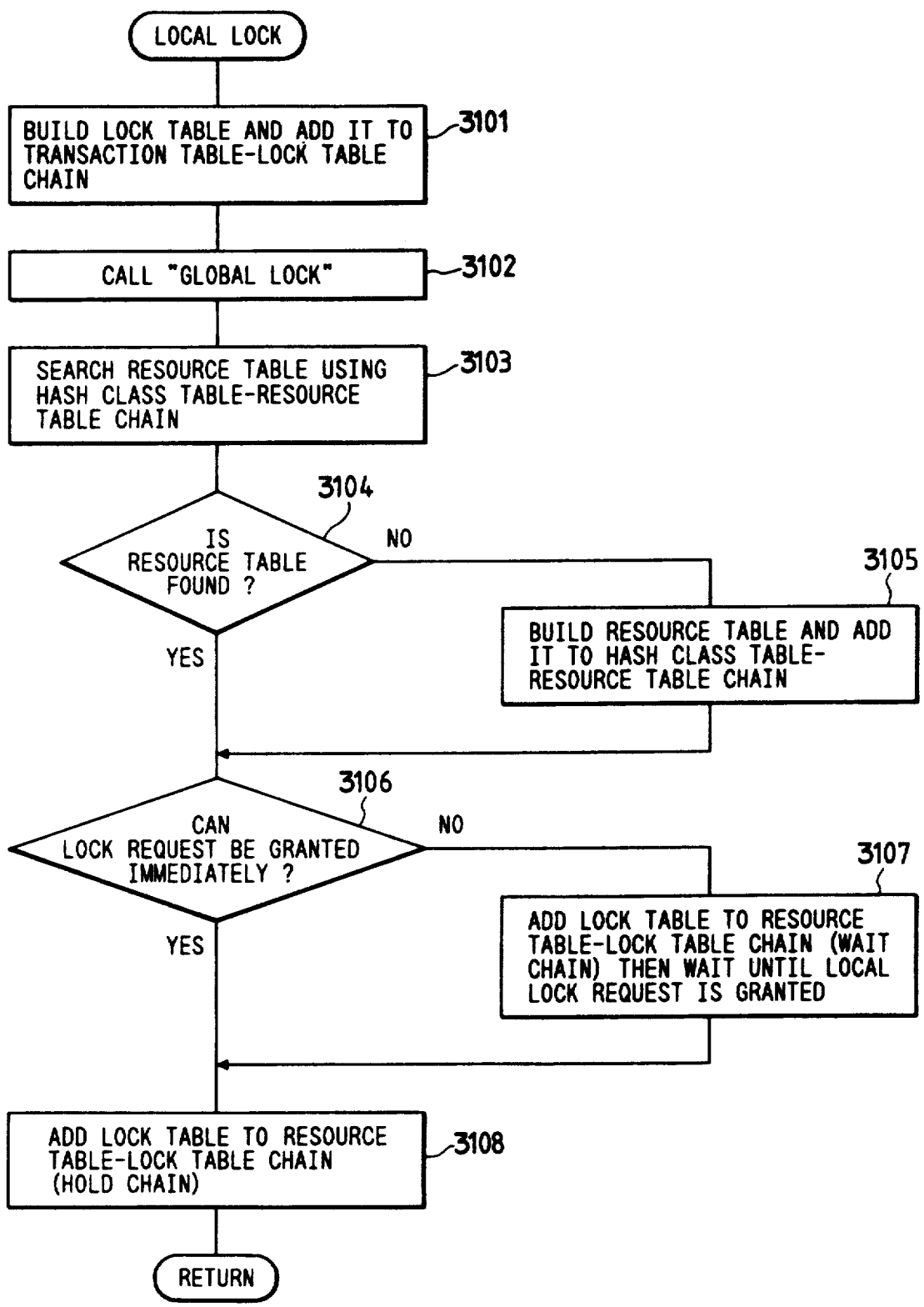
FIGS. 27 to 33 are flowcharts of the lock and unlock processing.

FIG. 27 shows the flow of the local lock processing. When the transaction issues the lock request for the lock manager, this local lock processing is first actuated. Here, the input parameters of the local lock request are the data resource name of the lock object, the lock mode and the transaction table corresponding to the lock requesting transaction. When accepting the local lock request, the lock manager builds the lock table corresponding to the lock request, connects it to the chain from the transaction table (step 3101) and calls the later-appearing global lock processing (step 3102). Next, whether or not the resource table corresponding to the lock object data resource has already been built is confirmed by following the pointer chain of the resource table chained from the hash class table designated by the output of the global lock processing (steps 3103, 3104), and if it is not, the resource table is built afresh and connected to the chain (step 3105). If other locks are not put to the lock object data resource or if only the lock which is compatible with the present lock request is put to the lock object data resource, the present lock request is permissible. Therefore, the lock table is connected to the lock holding chain from the resource table and returned to the requester (steps 3106, 3108). If the lock which is contradictory to the present lock request has already been put to the data source, the lock table is connected to the local lock waiting chain from the resource table and the local lock removal communication from the lock occupying transaction is waited for (step 3107). The local lock processing described above is substantially the same as the ordinary lock processing except that the global lock processing is called at the step 3002. Though the exceptional processings such as a processing when the lock cannot be reserved instantaneously and a processing when the lock requesting transaction has already held the lock to the data resource can be made by variations such as the error return flow without making the lock waiting, their explanation will be hereby omitted because they are not essential to the gist of the present invention.

(1 - 2) Local Lock Removal

Figure 28:
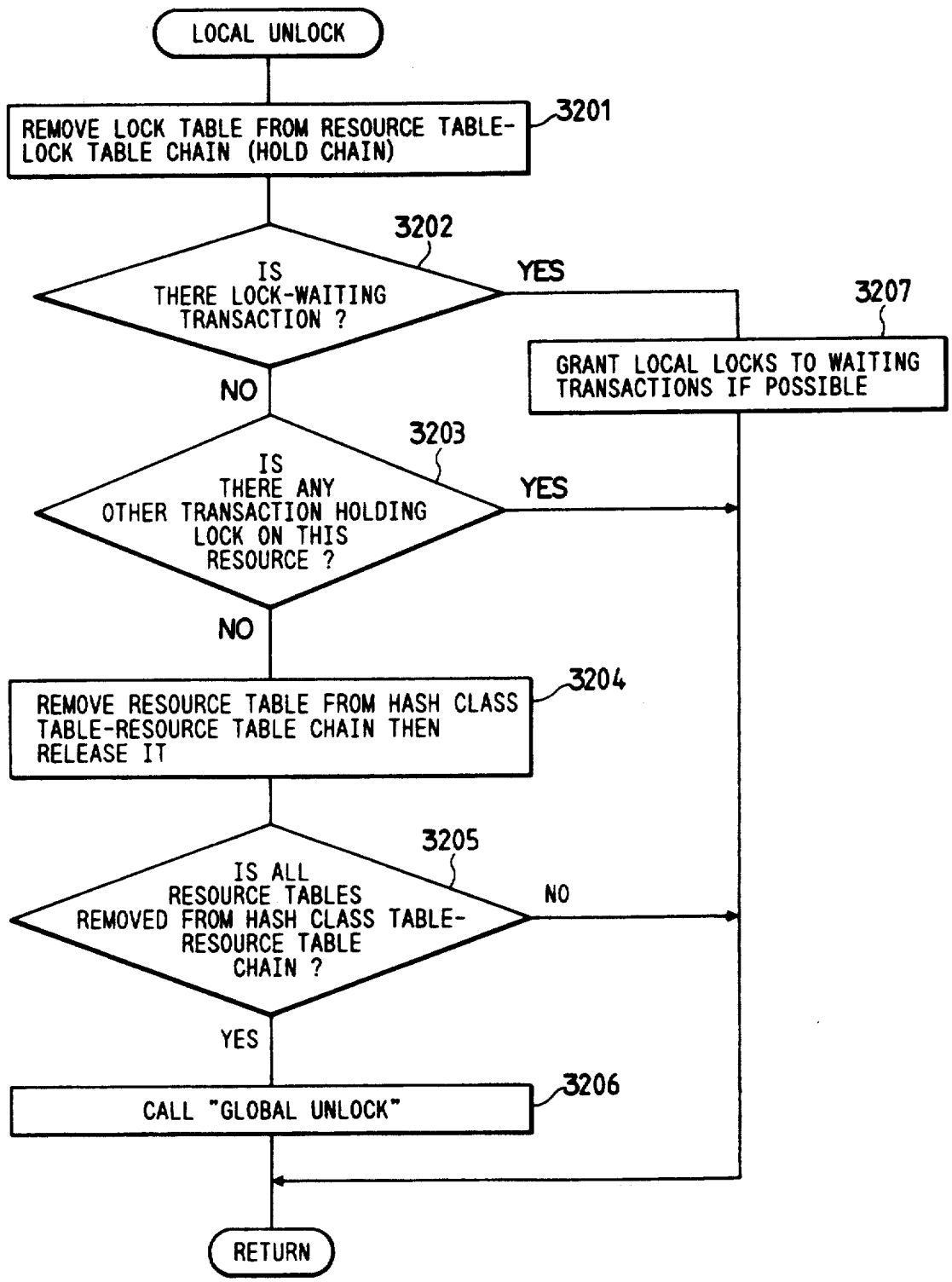

FIG. 28 shows the flow of the local unlock processing. When the unlock request is issued from a transaction, this local unlock processing is first executed in the same way as the local lock processing. The input parameter of the local unlock processing designates uniquely the unlock object and is, for example, the name of the data resource and the transaction table. The address of the lock table itself may also be designated directly. The lock manager finds out the lock table of the unlock object corresponding to the unlock request by the designation of this input parameter, removes it from the lock holding chain from the resource table and at the same time, removes the lock table from the chain from the transaction table to release the lock table (step 3201). Next, the local lock waiting chain from the unlock object data resource is examined (step 3202) and if there is any lock request which can be granted by this unlock, the local lock request waiting is released (step 3207) and thereafter returned to the requester. The local lock waiting hereby released is generated at the step 3107 of FIG. 27 explained with reference to the local lock processing. When all the local locks to the data resource are removed by the present unlock processing, that is, when the holding lock chain from the resource table becomes empty, that resource table is released (steps 3203, 3204).

When all the resource tables of the data resource belonging to the same hash class as that of the data resource are released by the release of the resource table described above, or in other words, when the resource table chain from the hash class table becomes empty, the global unlock processing is called (steps 3205, 3206).

If other local locks still remain in the data resource at the step 3203 or if the resource table belonging to the hash class still remains at the step 3205, the flow returns as such without calling the global unlock processing. This local unlock processing, too, is substantially the same as the ordinary unlock processing except for the global unlock processing call conducted at the step 3206.

(1 - 3) Global Lock Reservation

Figure 29:
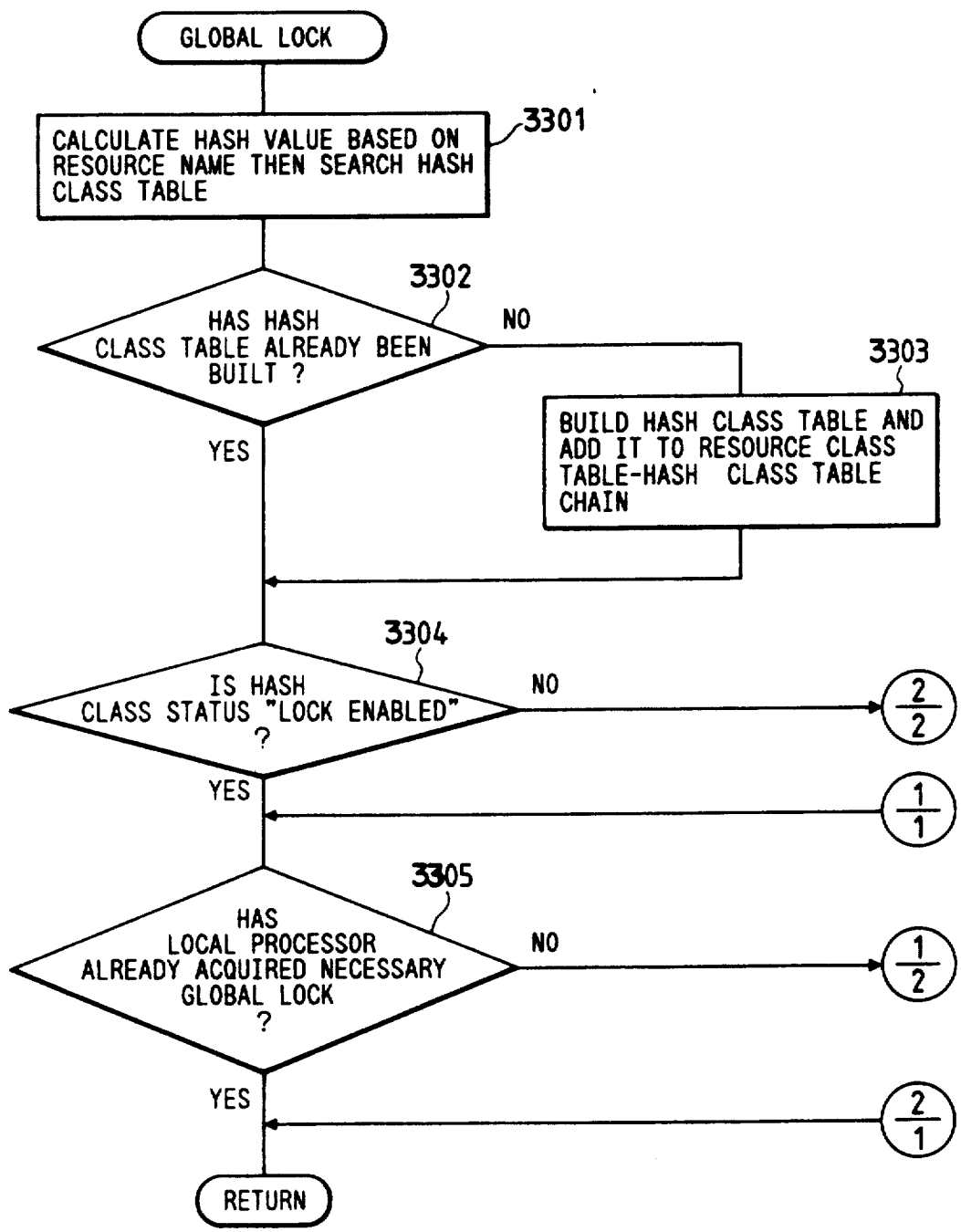
Figure 30:
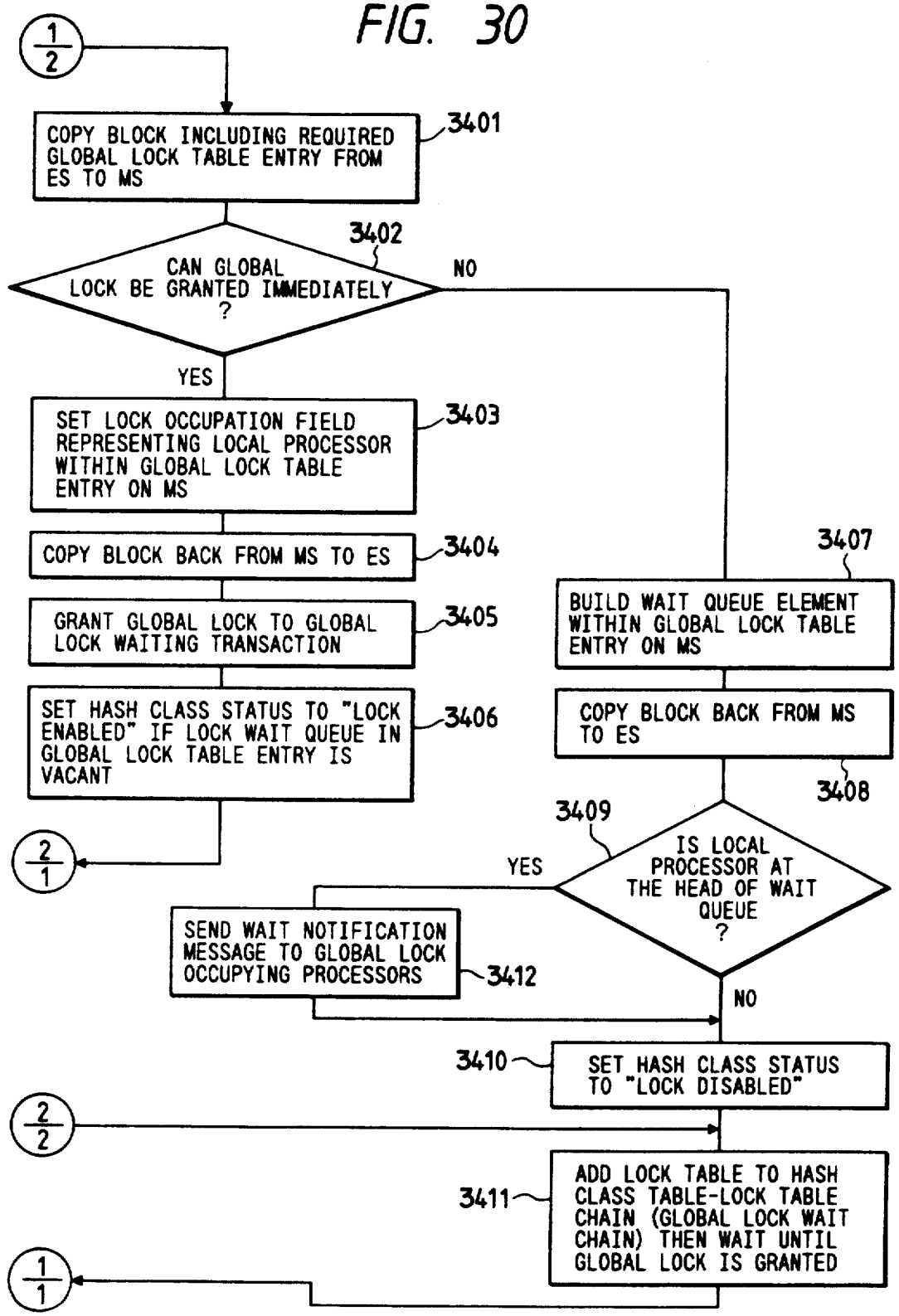

FIGS. 29 and 30 show the flow of the global lock processing. The global lock processing is called from during the execution of the local lock processing (step 3102 in FIG. 27) and its input parameters are the hash value of the lock object hash class and the lock table. The object of the global lock is not the individual data source but is the hash class and the lock retention main body is not the transaction but is the data processing units. In these points, the global lock is different from the local lock. In the global lock processing, the hash class table of the lock object is first searched (step 3301) and if the table does not exist, it is built afresh and pointed to from the resource class table (steps 3302, 3303). At the point of time when the hash class table is built afresh at the step 3303, the hash class is under the lock enabled state. Next, whether or not the lock object hash class is under the lock enabled state is confirmed (step 3304) and if it is, whether or not the data processing unit of its own has already secured the global lock of the mode including the present global lock request is examined (step 3305). If the global lock including such a request has already been reserved, it is returned as such to the requester. If the data processing unit of its own has not reserved the global lock or even if it has reserved the global lock but its lock mode does not include the present global lock request, a necessary global lock is to be acquired. If the result of the check at the step 3304 results in the lock disabled state, global lock waiting is entered (step 3411). Setting and change of this lock enabled state will be described later. As can be understood from the description given above, no access to the global lock management table on the extended storage occurs if the data processing unit of its own has already reserved the necessary global lock.

Acquisition of the global lock is made in the manner shown in FIG. 30. First of all, the block of the extended storage including the global lock management table entry corresponding to the hash class of the lock object is transferred to the main storage (step 3401) and whether or not the global lock can be acquired is examined (step 3402). If the other data processing units do not put the global lock to the object hash class or if the other data processing units have already put the global lock but its lock mode is compatible with the present global lock request, the occupation map in the global lock management table entry corresponding to its own data processing unit is set (step 3403) and its block is written back to the extended storage (step 3404). When compatibility of the lock mode is examined at the step 3402, the lock mode to be acquired not only relies on the lock request of the transaction as the cause of the call of the global lock processing this time, but also includes all the lock requests waiting for the global lock for the hash class. In other words, the global lock request is executed in the form gather the lock request from a plurality of transactions waiting for the global lock in one form. Next, the lock table of the global lock waiting that is chained from the hash class table on the main storage is followed from the leading part of the chain and global lock waiting is sequentially removed (step 3405).

If the queue is empty as the result of examination of the queue in the global lock management table entry or in other words, if no other data processing unit waiting for the global lock exists, the hash class is set to the lock enabled state (step 3406) and returns it to the requester. If the other data processing unit has already reserved the global lock which is contradictory to the global lock request this time, the request of its own data processing unit is set to the global lock waiting queue in the global lock table entry (step 3407) and its block is written back to the extended storage (step 3408). Then, the object hash class table is set to the lock disabled state on the main storage of its own data processing unit (step 3401), the lock table is connected to the global lock waiting chain from the hash class table and the global lock release of other data processing unit is awaited (step 3411). If its own data processing unit is the leading member of the lock waiting units when the queue information is set to the global lock table entry at the step 3406, the occurrence of the global lock waiting is communicated to other global lock occupying data processing units (steps 3409, 3412). When the global lock waiting of the step 3411 is released, the lock manager tries once again the global lock acquisition from the step 3305. The reason why the hash class is set to the lock disable state at the step 3410 is to service the lock request occurring in its own data processing unit on the FIFO (First-In First-Out) basis. Therefore, the global lock requested which is accepted later than the present global lock request is caused to wait even if it is instantaneously permitted from the judgement of compatibility of the lock mode alone.

Figure 32:
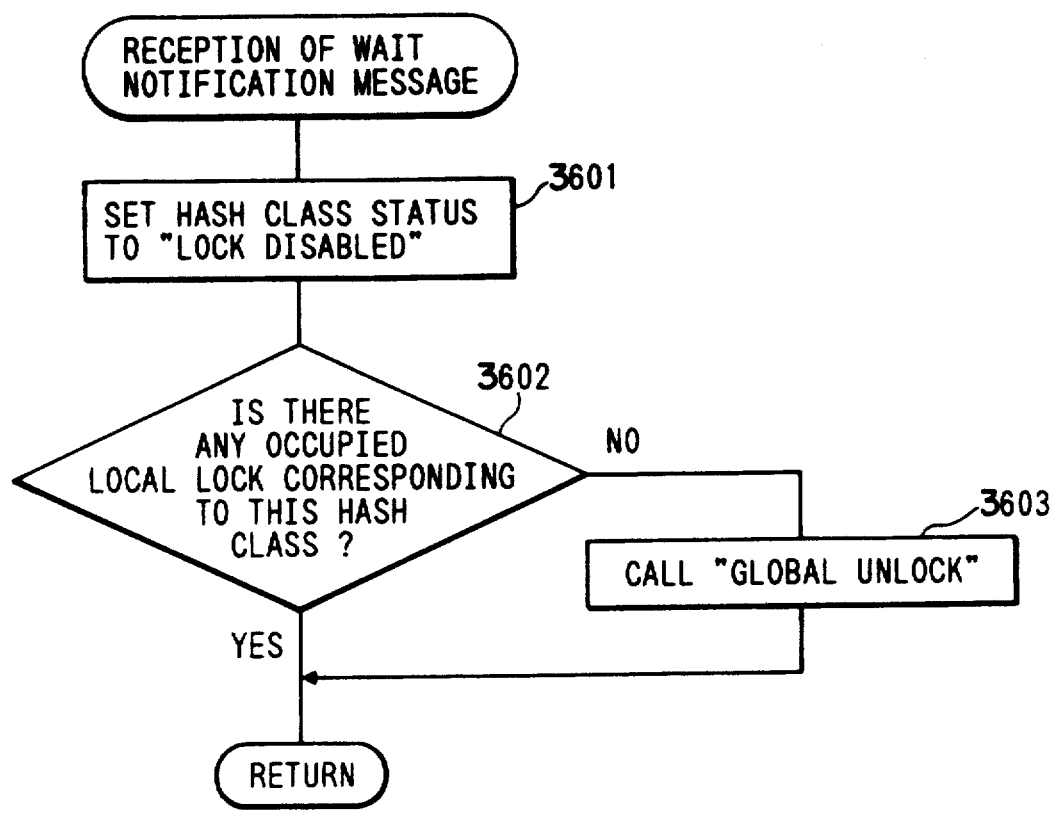

The data processing unit that receives the global lock wait notification meassage transmitted at the step 3412 executes the processing such as shown in FIG. 32. First of all, the hash class table corresponding to the hash class designated in the notification message is searched and its hash class is set to the lock disabled state (step 3601). Accordingly, the lock requests occurring in this data processing unit for the data source belonging to the hash class all become global lock wait and unnecessary long occupation of the global lock can be prevented. If no local lock for the data source belonging to the hash class exists at the time of reception of the lock wait notification message, the global unlock processing is called (steps 3602, 3603). Such a case can occur when the global lock request for the hash class does not occur from other data processing units after a data processing unit has acquired the global lock for a certain hash class till the local locks for the data resource belonging to that hash class are all removed.

(1 - 4) Global Lock Removal

Figure 31:
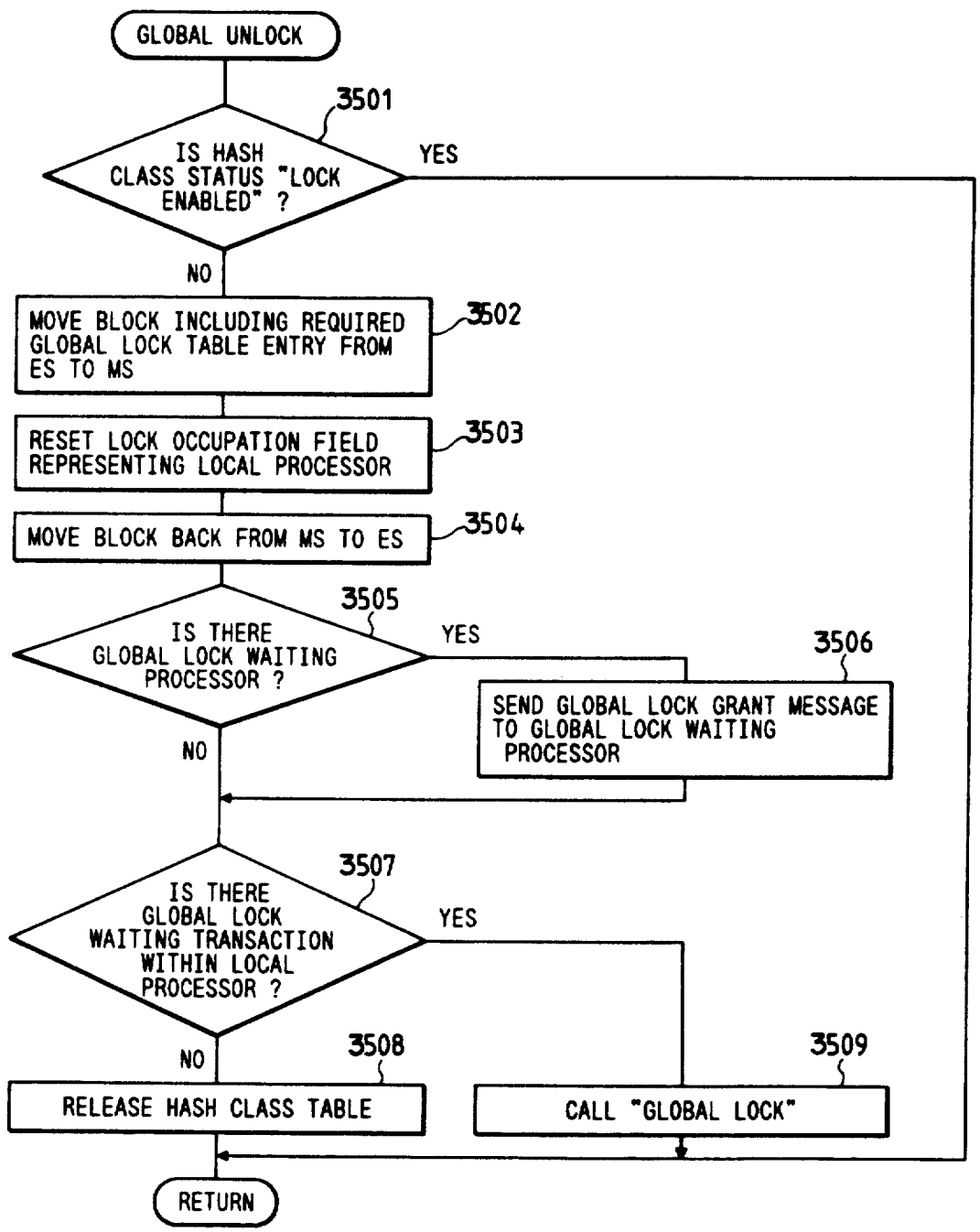

FIG. 31 is the flowchart of the global unlock processing. In the global unlock processing, the hash class of the unlock object becomes the input parameter and the lock enabled state of the hash class is first examined (step 3501). If the hash class is under the lock enabled state, the flow returns as such to the requester without doing anything. This is in order to reduce the global lock reservation overhead for the data resource belonging to this hash class when the next lock request is generated. If the hash class is found under the lock disabled state or in other words, if the global lock wait occurs in its own data processing unit or in the other processing unit for the hash class at the step 3501, the occupied global lock is removed. The lock manager transfers the block of the extended storage containing the global lock management table entry corresponding to the hash class as the removal object in order to release the global lock (step 3502), resets the lock occupying map of its own data processing unit on the main storage and writes it back into the extended storage (steps 3503, 3504). At this time, the queue in the global lock management table entry is examined and if any other data processing unit which becomes capable of acquiring the global lock due to the release of the global lock of its own data processing unit, the lock removal notification message is transmitted to that data processing unit (steps 3505, 3506). If the global lock wait for the hash class occurs inside its own data processing unit and that global lock request can be acquired at the time of this global lock release, the global lock processing is called (step 3507, 3509). If such a global lock does not exist inside its own data processing unit, the hash class table is released and returned to the requester (step 3508).

Figure 33:
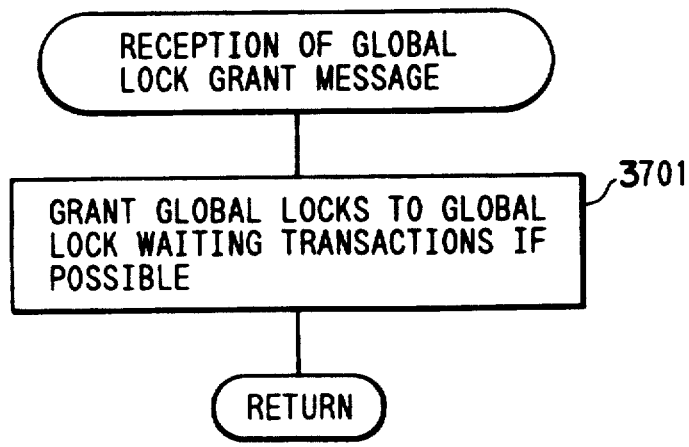

FIG. 33 shows the flow of the processing in the data processing unit which receives the lock release notification message transmitted at the step 3506. In this case, the lock manager views the global lock waiting chain of the hash class table corresponding to the hash class having the released global lock, and the waiting of the first of the chain is released (step 3701). This waiting has occurred during the global lock processing (step 3411 in FIG. 30) and the released lock request retries the global lock reservation.

The above explains the lock and unlock processings in this embodiment, and various variations can be made as the method of associating the local lock and the global lock. In the global unlocking processing of this embodiment, the release of the global lock is not executed unless the global lock waiting for the hash class occurs in the other data processing units. In this manner, the overhead for the acquisition of the next global lock is reduced. If the global lock waiting occurs in other data processing units for the hash class whose global lock the data processing unit of its own holds, the global lock request from inside its own data processing unit is rejected by setting the hash class in its local lock management table to the lock disabled state, so as to prevent the occupation of the global lock for an unfairly long period. This method is particularly effective for reducing the global lock overhead in a system where the distribution of the hash classes as the object of the global lock tends to be separated for each data processing unit. In contrast, in a system wherein the global lock shifts frequently between the data processing units, the lock waiting generation notification in this embodiment is not effected so as to reduce the communication overhead between the data processing units. In accordance with this method, the hash class is set to the lock disabled state by use of indices representing that the global lock is occupied beyond a predetermined period, a number of local locks above a predetermined number are given inside its own data processing unit, and the like. Thus, the occupation of global lock is prevented. It is also possible to employ the method which lets the local lock request and the global lock request correspond to each other on the 1:1 basis without executing collectively the global lock processing of the lock requests from a plurality of transactions as is made in this embodiment. This can be employed when the gap is small between the extended storage access overhead and the main storage access overhead, and can simplify the lock manager processing.

(1 - 5) Deadlock Detection

The lock manager can detect the waiting loop between the transactions inside its own data processing unit by scanning the local lock management table. In the environment wherein a plurality of data processing units gain access by sharing the data resource as in the present invention, detection of the waiting loop bridging between the data processing units (global deadlock) must be made in addition to the local dead lock described above.

Figure 23:
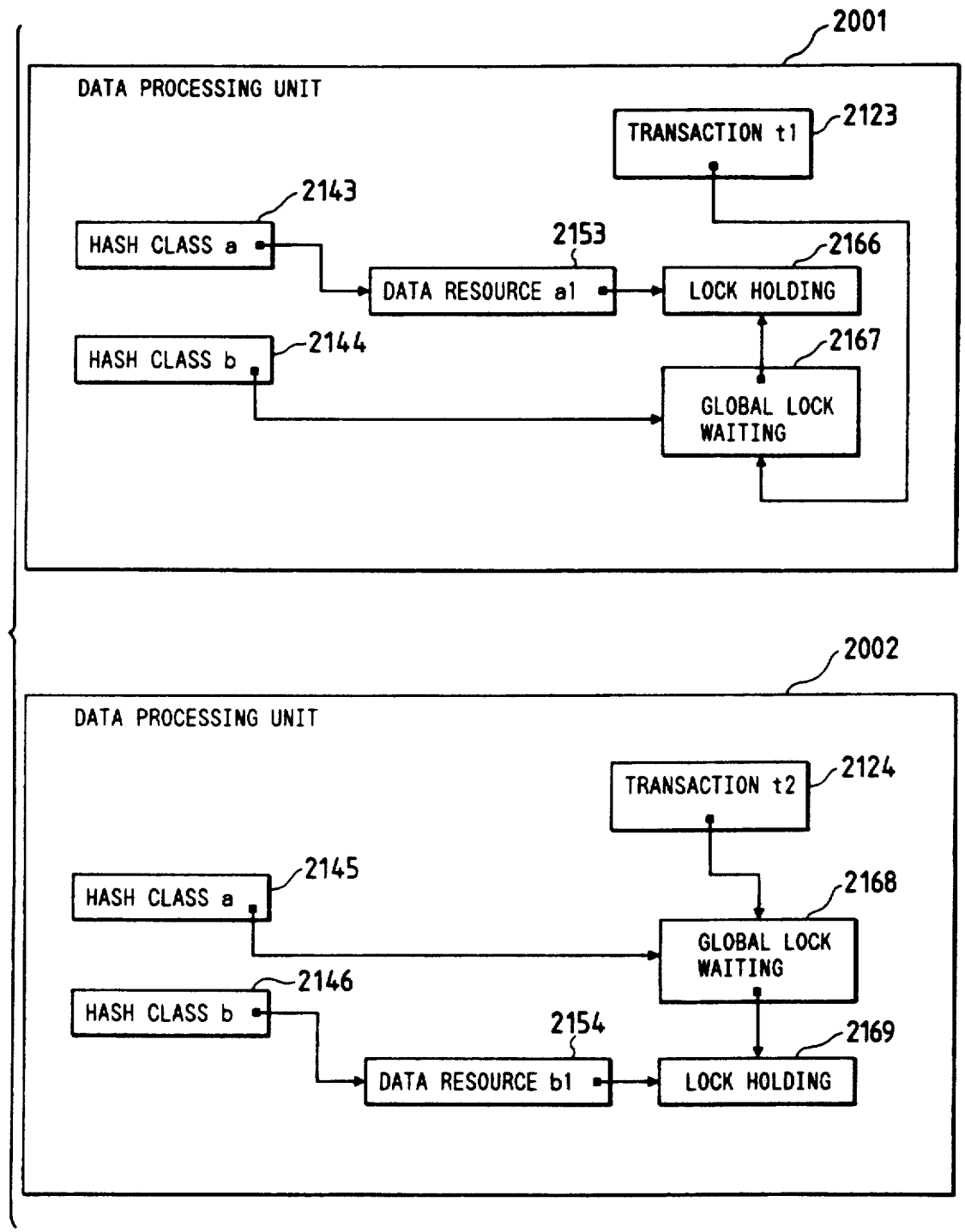
FIG. 23 shows an example of global deadlock.

FIG. 23 shows an example of the global deadlock. In FIG. 23, the transaction t1 operating on the data processing unit 2001 has the local lock for the data resource a1 belonging to the hash class a and is under the global lock waiting for the hash class b. On the other hand, the transaction t2 operating on the data processing unit 2002 holds the local lock for the data resource b1 belonging to the hash class b and is under the global lock waiting for the hash class a. In FIG. 23, reference numerals 2123-2124 are transaction tables, 2143-2146 are hash class tables, 2153-2154 are data resource tables and 2166-2169 are lock tables. The cooperation of a plurality of lock managers is necessary for detecting such a deadlock.

Figure 34:
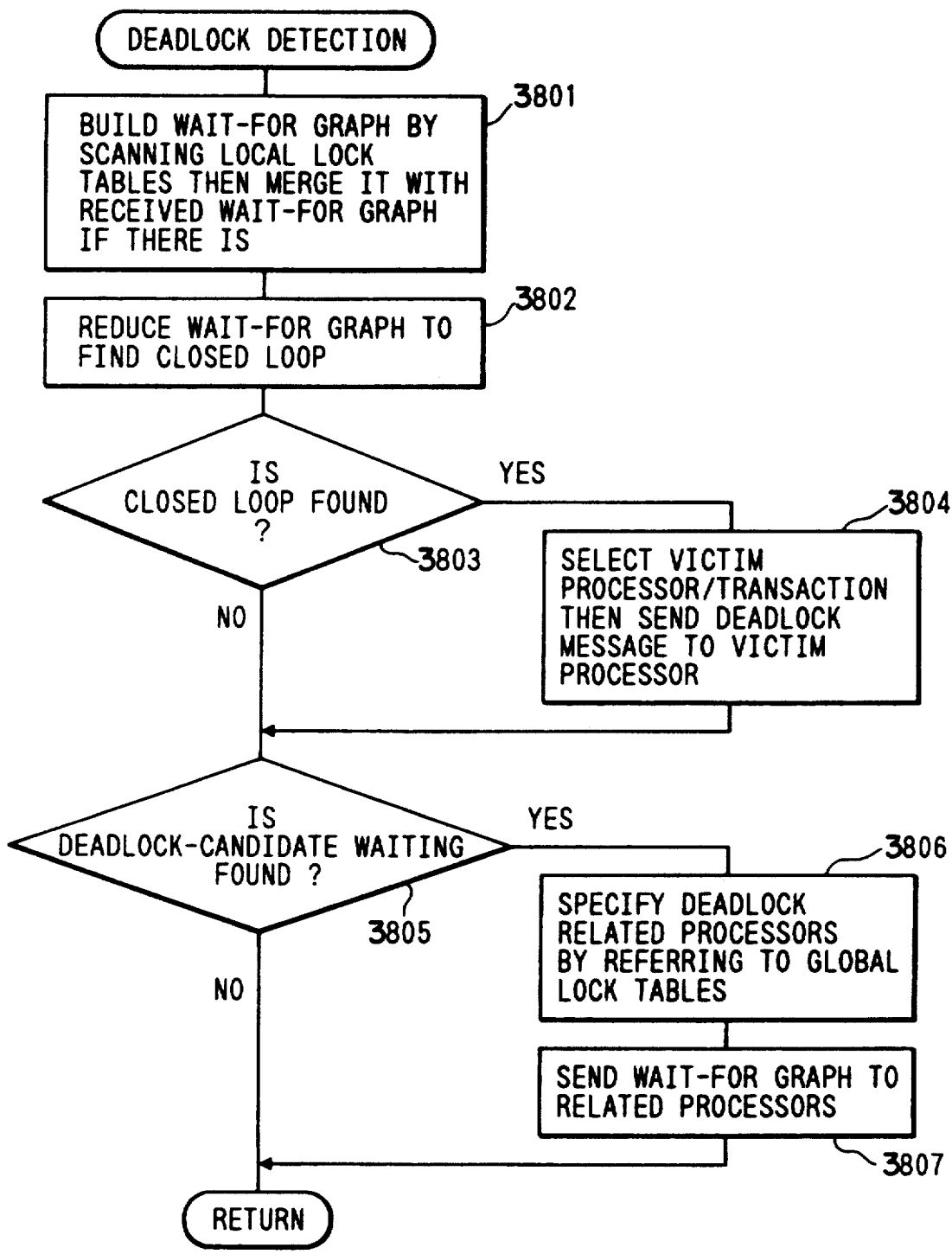
FIG. 34 is a flowchart of the dead lock detection processing.

FIG. 34 is a flowchart of the global deadlock detection processing. The deadlock detection processing is actuated when at least a predetermined number of transactions are under the lock waiting state every predetermined time, or when a wait-for graph from the other data processing unit is received. When the deadlock detection processing is actuated, the lock manager scans the local lock management table inside its own data processing unit and builds the wait-for graph of the transaction (step 3801), and then reduces or simplifies the wait-for graph (step 3802). In the case of the processing which is actuated by receiving the wait-for graph from the other data processing units, the wait-for graph in its own data processing unit and the wait-for graph received are composed and then simplified. Here, the expression method of the wait-for graph on the data processing unit and the simplification algorithm of the graph may be arbitrary. If the wait loop or closed loop is found as a result of simplification of the wait-for graph, a victim transaction is selected and a deadlock message is sent to the victim transaction (steps 3803, 3804). The closed loop discovered hereby includes both the local deadlock and the global deadlock. The transaction that receives the message makes a roll-back processing and releases the lock of the data source it occupies. An arbitrary standard may be used as the selection standard for the victim transaction. If the selected victim transaction is operating on the other data processing unit, transmittion of the message notifying the occurrence of the deadlock is necessary.

Next, whether or not a global deadlock candidate exists in the wait-for graph is confirmed (step 3805). Here, the term "global deadlock candidate" means the graph which is expressed by a wait-for series having its start in other data processing unit and its end in the other data processing unit and it is a graph having the possibility of the occurrence of the wait-for loop bridging between a plurality of data processing units. That the transaction on its own data processing unit waits for the transaction on another data processing unit can be known from the existence of the global lock wait-for chain from the hash class table. That the transaction on another data processing unit waits for the transaction on its own data processing unit, on the contrary, is stored in the hash class table at the time of reception of the global lock wait-for occurrence message from another data processing unit. If this global deadlock candidate exists, which data processing unit is waited for is examined by making reference to the global lock management table on the extended storage (step 3806), and the wait-for graph of the candidate is transmitted to that data processing unit (step 3807). The occurrence of the global lock waiting can be known by scanning the local lock management table but between which data processing units the waiting occurs cannot be determined unless reference is made to the global lock management table. If the detailed information on the global lock waiting is obtained only from the local lock table, the communication must be made between the data processing units whenever the occurrence and release of the global lock waiting occur, and the communication overhead becomes great. The global deadlock processing is actuated on the reception side of the wait-for graph.

If the deadlock or the deadlock candidate cannot be found at the steps 3803 and 3805, it means that the global deadlock does not exist and the deadlock detection processing is therefore complete. If the global deadlock occurs, the deadlock detection processing is actuated substantially simultaneously in a plurality of data processing units. Therefore, there is the possibility that the global deadlock candidate is detected in each data processing unit and communication is made more than necessary between the data processing units. This problem can be solved by setting the unique sequence relation to the data processing units, for example, and making the communication of the wait-for graph of the deadlock candidate only from the preceding data processing unit to the succeeding data processing unit in the sequence relation. Since the global lock is made in the hash class unit in this embodiment, there is the possibility that the global deadlock is generated simply because a plurality of mutually irrelevant data resources are accidentally contained in the same hash class, even though the deadlock does not exist when the lock request is viewed in the individual data resource unit. The probability of occurrence of such an unnecessary deadlock becomes smaller when the correspondence between the hash class and the data resource is brought closer to 1:1. This can be controlled by the selection of the hash function and by the preparation of a suitable number of global lock management table entries on the extended storage.

In the following paragraphs, the processing of the lock manager when various failures occur in the system will be described. The basic principle for the occurrence of failures is to inhibit the access to the data resource within the range which is limited as much as possible till the recovery of the failure in order not to deteriorate the coordination of the data. The system failure can be classified broadly into the following three forms, i.e. the failure of the subsystem, the failure of the communication apparatus and the failure of the data processing unit, and they will be described below sequentially.

(1 - 6) Failure of Subsystem

When the failure of the subsystem on its own data processing unit is notified, the local manager holds the local lock which the subsystem has held, and nullifies the lock request under the wait-for state among the lock requests made by the subsystem. If the local lock request which is not compatible with the held lock mode is made for the data resource, the lock manager makes that lock request the error return without bringing it into the wait-for state to prevent the occurrence of lock waiting for a long time. Here, detection of the failure of the subsystem and the notification mechanism to the lock manager will not be described because they are not particularly relevent to the present invention. The local manager holds the local lock and holds also the global lock in such a manner as to include the local lock thus held. Holding of the local lock is stored on the data resource table on its own data processing unit and holding of the global lock is stored on the global lock management table entry on the extended storage. The control of access inhibition to the other data processing units is made in the hash class unit through the global lock thus held. In other words, the lock manager of other the data processing unit causes the error return of the held global lock request without setting it to the wait-for state. Holding of these local lock and global lock is released when the failure of the subsystem is recovered and the data coordination restoration processing is complete.

(1 - 7) Failure of Communication Apparatus

If a communication apparatus is out of order and communication with the other data processing units becomes impossible, the lock manager causes the error return of the global lock request if an uncommunicatable data processing unit occupies the global lock, which is not compatible with the requested global lock mode, in the global lock reservation processing. In this case, the lock manager does not make any particular processing for storing the lock holding state in the table. Therefore, no particular processing is made, either, when the failure of the communication apparatus is recovered.

(1 - 8) Failure of Data Processing Unit

The failure of other data processing units is detected by a monitor apparatus (not shown in the drawing) and is notified to the lock manager. Receiving the notification, the lock manager scans the global lock table entry on the extended storage, sets the global lock that the broken data processing unit has held to the holding state and nullifies the global lock request under the wait-for state. This holding state is stored in the global lock table entry, and all the global lock request which are not compatible with the held global lock are subjected to the error return. This lock holding is released when the recovery processing of all the subsystems operating on the broken data processing unit is complete.

The lock holding described above which results from the failure of the subsystem and the failure of the data processing unit need not be made for the locks of all the modes. Coordination of the data resource can be insured sufficiently by inhibiting the access to only the dirty data resource, that is, only the data resource which is updated by the subsystem which becomes inoperative. Accordingly, only the locks having the lock modes for updating data (SU, PU and EX modes in this embodiment) need to be held and the locks having the lock modes for data reference (SR and PR modes in this embodiment) may be released.

THIRD EMBODIMENT

Figure 24:
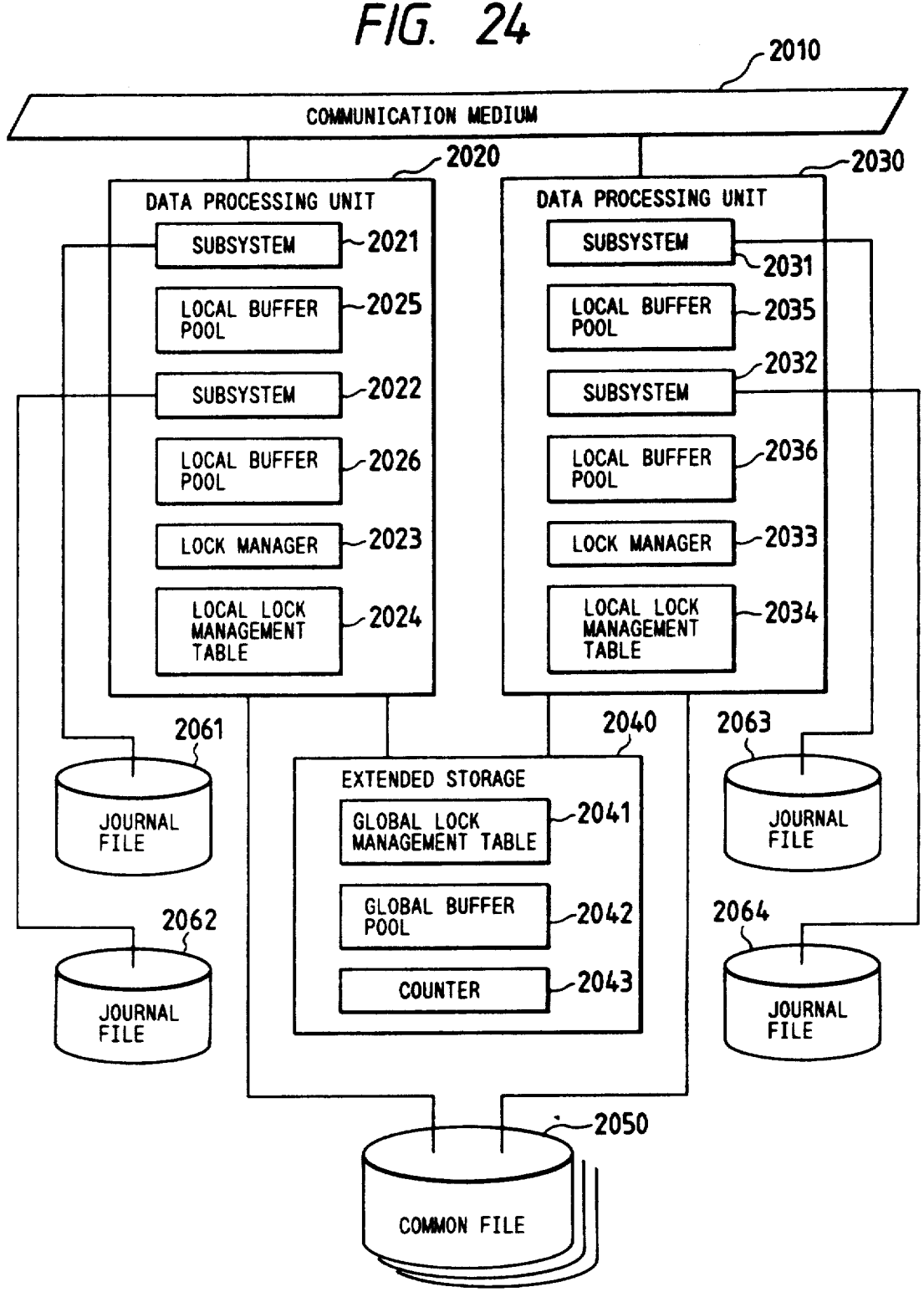
FIG. 24 is a block diagram of a computer system showing the third embodiment of the present invention.

FIG. 24 is a block diagram of the computer system in accordance with the third embodiment of the present invention. In this third embodiment, sharing of the data resource is accomplished through the organic cooperation of the buffer managers and journal managers of the subsystems in addition to the lock manager of the second embodiment. In FIG. 24, each subsystem 2021, 2022, 2031, 2032 is equipped with a buffer pool 2025, 2026, 2035, 2036 for gaining access to the data resource and a journal file 2061, 2062, 2063, 2064 for storing updating of the data resource. Furthermore, a global buffer pool 2042 to be shared by all the subsystems may be disposed on the extended storage. A counter 2043 which is referred to, and updated by, all the subsystems is disposed on the extended storage. The rest of constructions are the same as those of the second embodiment shown in FIG. 17. The description of the lock processing and unlock processing made by the lock manager is hereby omitted because they are the same as those of the second embodiment but the buffer management method and the journal management method which constitute the characterizing features of the third embodiment will be described in detail.

(2 - 1) Buffer Management

Figure 25:
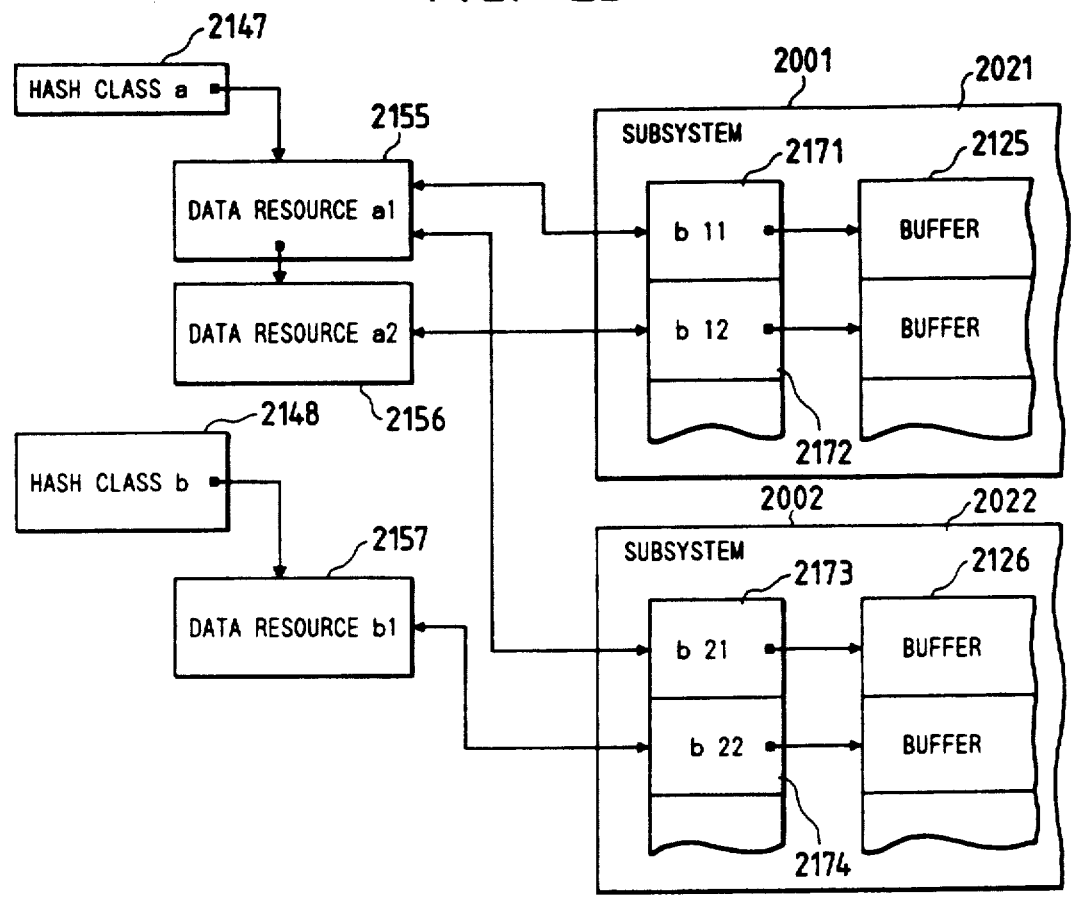
FIG. 25 shows the association of a lock management table with a buffer management table.

When a plurality of subsystems operating on a plurality of data processing units make access to a common data resource stored on a common file, there are the case where a global buffer is used as an I/O buffer and the case where a local buffer is used. The global buffer is disposed on the common extended storage and is used by all the subsystems. Therefore, the data resource which a certain subsystem updates on the global buffer is immediately accessible by other subsystems. In contrast, the local buffer is disposed on the main storage in such a manner as to correspond to each subsystem and is used by only one subsystem. Therefore, the same data resource is held on the local buffers of a plurality of subsystems, its content is not reflected on the data resource on the local buffers of other subsystems even when one subsystem updates the data source and there is therefore the possibility that data consistency cannot be held. To prevent this problem, this embodiment establishes the linkage between the lock manager and the buffer manager of the subsystem. FIG. 25 shows the association of the tables managed by the lock manager and the buffer manger in the third embodiment. In FIG. 25, reference numerals 2147-2148 represent hash class tables, reference numerals 2155-2157 are data source tables, 2021-2022 are subsystems, 2171-2174 are buffer management tables and 2025-2026 are local buffer pools. The association between the hash class table and the data resource table is the same as the one shown in FIG. 18. A buffer management table is disposed so as to correspond to each buffer and contains what data resource is stored in the buffer. When accessing to the data resource, the subsystem first issues the lock request to the lock manager and when the lock is reserved, examines whether or not the intended data resource has already existed on the buffer by scanning the buffer pool. If the intended data resource does not exist in the buffer pool, an empty buffer is secured to read the data resource. The subsystem finishes the necessary updating for the data resource and after reflecting the content of that data on the file, issues the unlock request to the lock manager to release the lock.

This embodiment establishes the linkage between the lock manger and the buffer manger by setting a bidirectional pointer chain between the buffer management table and the data resource table corresponding to the data resource stored in the buffer. FIG. 25 shows the example where the data resource a1 is stored in the buffer b11 of the local buffer pool of the subsystem 2001 and in the buffer b21 of the local buffer pool of the subsystem 2002, the data source a2 is stored in only the buffer b12 of the subsystem 2001 and the data resource b1 is stored in only the buffer b22 of the subsystem 2002. In the second embodiment, the data resource table is released when the local locks for the data resource are all released but in the third embodiment, the data resource table is released when the local locks are all released and moreover, their data resources are purged out from the local buffer pool of all the subsystems of its own data processing unit. On the contrary, when the data resource is read into the buffer, the lock for that data source has always been secured in advance in the buffer and accordingly, the data resource table corresponding thereto has already been built.

Figure 35:
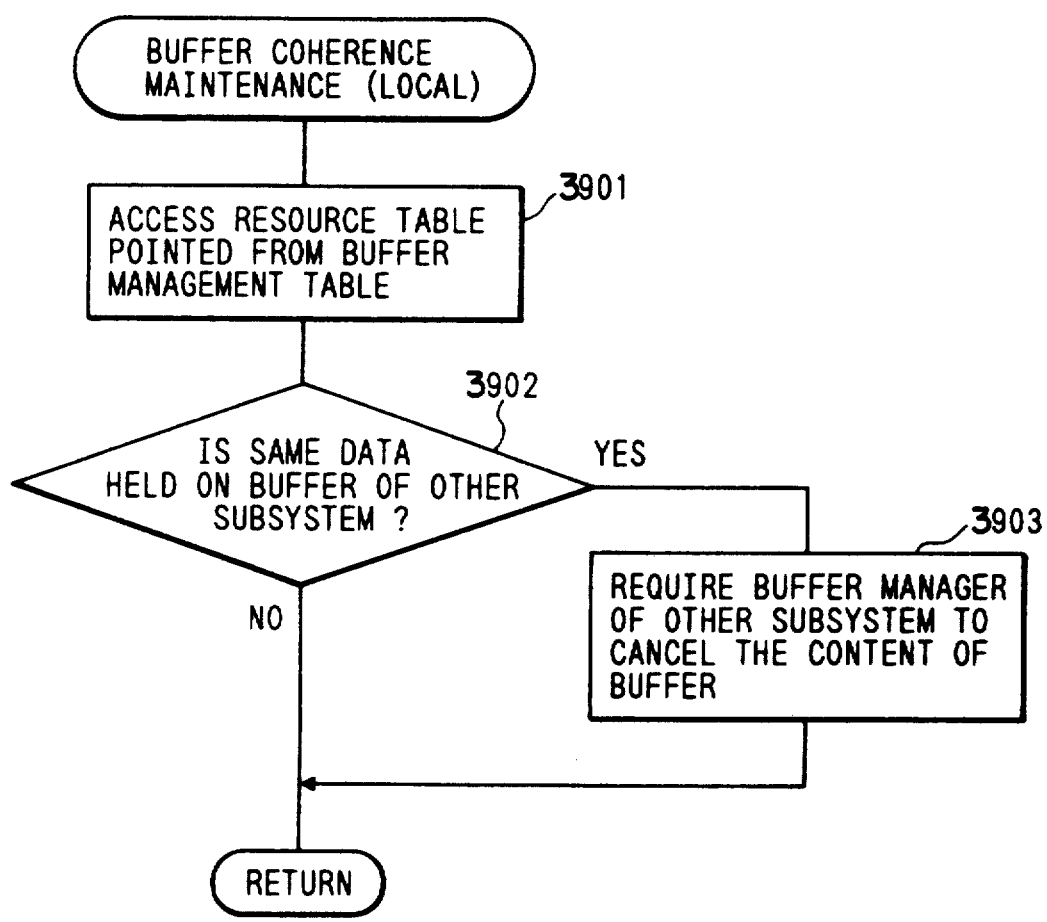
FIGS. 35 and 36 are flowcharts of the coherence/updating processing between buffers

The synchronization method of the data content between the local buffers can be divided into the synchronization processing between a plurality of subsystems in one data processing unit and the synchronization processing between a plurality of data processing units. Buffer synchronization between the subsystems in the same data processing unit will be explained with reference to the flowchart shown in FIG. 35. When the data is updated on its own local buffer, the buffer manager follows the data resource table from the buffer management table (step 3901) and confirms whether or not the data resource is stored in the local buffer pool of other subsystems in the same data processing unit (step 3902). If the data resource is stored in the local buffer of other subsystems, the buffer manager of that subsystem is called to make request that the buffer content be nullified. In FIG. 25, this corresponds to the case where the subsystem 2001 updates the content of the buffer b11. In this case, the buffer manager of the subsystem 2001 follows the data resource table 2155 from the buffer management table 2171 and knows that the data resource a1 is stored in the buffer b21, too. Accordingly, the buffer manager of the subsystem 2001 calls the buffer manager of the subsystem 2002 and requests it to nullify the content of the buffer b21. At this time, the subsystem 2021 secures the lock of the EX mode in order to update the data source a1 and in the subsystem 2002, the access to the data resource a1 does not exist or is under the lock wait-for state. When the access is made to the data resource a1 in the subsystem 2002, the latest content is read from the file because the content of the local buffer that has stored the data resource is nullified. In contrast, when the subsystem 2001 updates the data resource b12 stored in the buffer b12, the buffer manager of the subsystem 2001 follows the data resource table 2156 from the buffer management table 2172 and can recognize that the data resource b1 is not stored in the buffers of other subsystems. Accordingly, it does not call the buffer manager of the subsystem 2002.

Figure 26:
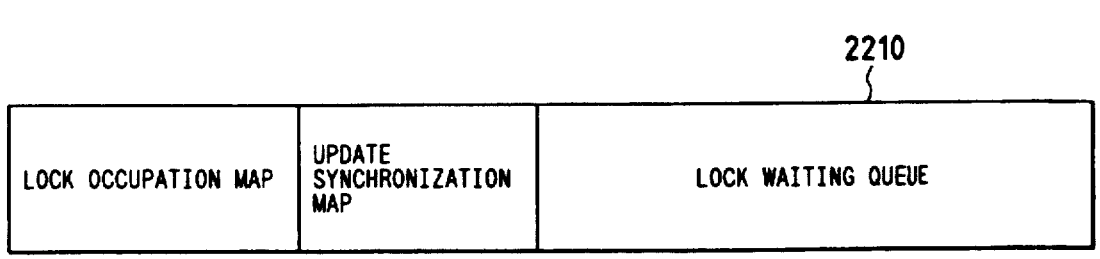
FIG. 26 shows global lock management table entry in the third embodiment of the present invention.
Figure 36:
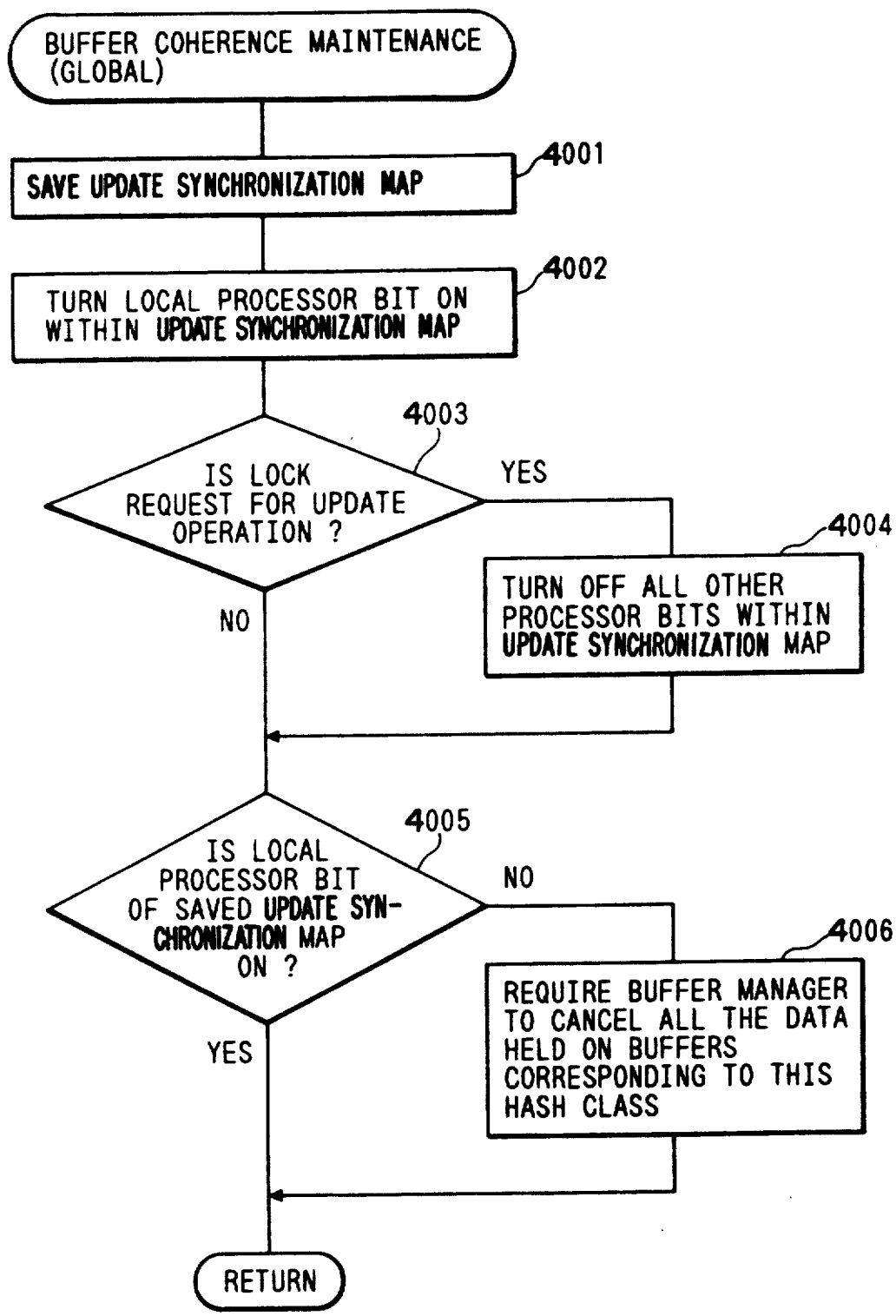

Next, the synchronization method between the data processing units will be explained. In this embodiment, an update synchronization map for storing the occurrence of updating for the data resource belonging to the hash class is disposed in the global lock management table entry as shown in FIG. 26. The rest of the fields of the global lock management table entries are the same as those shown in FIG. 20. The update synchronization map is a bit map which allots one bit to each data processing unit. The method of using this update synchronization map will be explained with reference to the flowchart shown in FIG. 36. In the global lock acquisition processing, the lock manager transfers the global lock management table entry corresponding to the lock object hash class from the extended storage to the main storage (step 3401 in FIG. 30). Here, the update synchronization map in the global lock management table entry is saved (step 4001) and when the global lock is reserved, the bit of the update synchronization map in the table entry corresponding to its own data processing unit is ON (step 4002). If the mode of the reserved global lock is for data updating (SU, PU, EX modes), the bits of the update synchronization map for the other data processing units are all OFF (steps 4003, 4004). If the bit of update synchronization is ON, it means the possibility that the subsystem on the corresponding data processing unit stores the data resource belonging to the hash class in its own local buffer pool. In the update synchronization map saved at the step 4001, if the bit corresponding to its own data processing unit is OFF, there is the possibility that the data resource belonging to the hash class is updated in other data processing units. Therefore, the lock manager requires the buffer manager of the subsystem to nullify the buffer storing the data resource belonging to the hash class on the local buffer pool of the subsystem operating in its own data processing unit (steps 4005, 4006). Receiving the request described above, the buffer manager instantaneously nullifies the buffer unless it is used but does not nullify it if the buffer is being used. The state where the buffer is being used means that the lock for the data resource stored in the buffer is held by its own subsystem, and updating of that data resource by the subsystems by the other data processing units cannot happen.

The buffer update synchronization processing between the data processing units is carried out not in the individual data resource unit but in the hash class unit. Therefore, there is the possibility that nullification of the buffer, which is originally unnecessary, is invited. The probability of such a side-effect becomes smaller when the number of elements of the global buffer management table entries is increased and the correspondence between the hash class and the data resource is brought closer to 1:1.

Coordination of the contents of the buffer pool of all the subsystems can be kept by combining the data update synchronization method between the local buffer pools of a plurality of subsystems in the same data processing unit and the data update synchronization method between a plurality of data processing units described above.

(2 - 2) Journal Management

In this embodiment, each subsystem is equipped with the journal file and updating of the data effected in its subsystem is recorded as the journal record. When the common file is out of order and the stored data cannot be used, the content of the file is recovered by merging in time-series the backup copy of the file at a certain point of time and the content of data updating recorded in the journal file. In a system where a plurality of subsystems share the data source and make updating such as the system of the present embodiment, it becomes necessary to merge in time series the journal record recorded independently for each subsystem. In this embodiment, a counter area (2043 in FIG. 24) is disposed on the common extended storage and the counter value is incremented whenever all the subsystem update the data and recorded on the journal record. Accordingly, updating of the data made by all the subsystems can be aligned in a unique time series. If this counter is used, it is possible to judge easily any fall-off the necessary journal record in the result of merger of the journal records.

According to the second and third embodiment of this invention described above, sharing of the data source by a plurality of data processing units can be accomplished without using any particular control apparatus and with a limited communication overhead. Accordingly, an economical, high performance data base sharing system can be constituted. Since the deadlock bridging between a plurality of data processing units can be detected with a small overhead by the embodiments of the present invention, system availability can be improved. If various failures occur in the system, the present invention can selectively inhibit the access to the data resource so that data maintenance can be maintained. According to the present invention, further, each subsystem can judge effectiveness of data in the buffer pool in the buffer pool with a small overhead so that the bufferring method can be employed even in the sharing environment of the data source. According to the present invention, since the journal record acquired by each subsystem can be aligned in the time series, data recovery can be made instantaneously even when the common file is out of order and the data source is lost. Thus, system reliability and availability can be improved.

What is claimed is:

1. A composite data processing system including a plurality of data processing units, each including at least one instruction processor and a main storage, said plurality of data processing units being connected in common to an extended storage, said system comprising:

means associated with one of said data processing units for storing therein information fetched from a part of a designated area in said extended storage;

an instruction processor in said one data processing unit for subsequently processing information fetched from said designated area in said extended storage;

means, coupled to said storing means, for subsequently referring to said designated area by said instruction processor in said one data processing unit to examine a condition of said information stored in said part of said designated area to determine whether it is in a predetermined condition in which it corresponds to the part previously stored based upon information stored in said storing means;

means for rewriting said designated area in said extended storage by said instruction processor in response to said part of said designated area being in said predetermined condition as indicated by said means for referring; and means responsive to a single instruction for controlling said referring means and said rewriting means to execute the operations from said referring operation to said rewriting operation as an inseparable operation during which the designated area is locked to other instruction processors.

2. A composite data processing system including a plurality of data processing units, each containing at least one instruction processor and a main storage accessible by said one instruction processor, and an extended storage shared by said data processing units and accessible by each one of said instruction processors, said system comprising:
- means associated with one of said data processing units for storing therein information fetched from a part of a designated area in said extended storage; an instruction processor in said one data processing unit for subsequently processing information fetched from said designated area in said extended storage;
- means, coupled to said storing means, for subsequently referring to said designated area by one of said instruction processor in said one data processing unit to examine a condition of said information stored in said part of said designated area to determine whether it is in a predetermined condition in which it corresponds to the part previously stored based upon information stored in said storing means;
- means for rewriting said designated area in response to said at least part of said designated area being in a predetermined condition as indicated by said means for referring; and
- means responsive to a single instruction for controlling said referring means and said rewriting means to execute the operations from said referring operation to said rewriting operation as an inseparable operation during which the designated area is locked to other instruction processors.

3. A composite data processing system including a plurality of data processing units, each one of said data processing units containing at least one instruction processor, having a general purpose register, and a main storage for storing data accessible by each one of said instruction processors, and an extended storage for storing data shared by said data processing units and accessible by each one of said instruction processors, each of said instruction processors fetches data from a part of a designated area in said extended storage and stores the fetched data into said general purpose register associated with said instruction processor prior to processing data fetched from said designated area, said system comprising:
- comparison means for comparing data stored in said general purpose register in one of said instruction processors after said one of said instruction processors processes data fetched from said designated area with current data of said part of said designated area in said extended storage to determine if a predetermined comparison result exists;
- write means for selectively writing the content of a designated area in said main storage into said designated area in said extended storage only if said predetermined comparison result is detected by said comparison means; and
- means responsive to a single instruction for controlling said comparison means and said write means to execute said comparison operation by said comparison means and said write operation by said write means as an inseparable operation during which the designated area of said extended storage is locked to other instruction processors so that said inseparable operation is in series with accesses to said designated area in said extended storage by said other instruction processors.

4. A composite data processing system including a plurality of data processing units, each one of said data processing units including at least one instruction processor and a main memory, and an extended storage shared by said data processing units, said system comprising:
- means associated with one of said data processing units for storing therein information fetched from a part of a designated area in said extended storage; an instruction processor in said data processing unit for subsequently processing information fetched from said designated area in said extended storage;
- means, coupled to said storing means, for subsequently referring to said designated area by said instruction processor in said one data processing unit to examine a condition of said information stored in said part of said designated area to determine whether it is in a predetermined condition in which it corresponds to the part previously stored based upon information stored in said storing means;
- means for rewriting an area in said extended storage designated separately from said designated area when the result of said means for referring indicates said predetermined condition; and
- means responsive to a single instruction for controlling said referring means and said rewriting means to execute the operations from said referring operation to said rewriting operation as an inseparable operation during which the designated area is locked to other instruction processors.

5. A control method for use in a composite data processing system including a plurality of data processing units each having at least one processor and a main memory, and an extended storage shared by said data processing units, and wherein a plurality of processes are executed in parallel with one another, said control method performed by said at least one processor comprising the steps of:
- storing information fetched from a part of a designated area in said extended storage;
- subsequently processing information fetched from said designated area in said extended storage;
- subsequently referring to said designated area by said processor to examine a condition of said information stored in said part of said designated area to determine whether it is in a predetermined condition in which it corresponds to the part of said designated area previously stored based upon information stored in said storing means;
- rewriting said designated area in response to said at least part of said designated area being in said predetermined condition as indicated by a result of said referring; and
- executing the operations from said referring operation to said rewriting operation in response to a single instruction as an inseparable operation in which said designated area is locked to other instruction processors.

6. A control method for use in a composite data processing system according to claim 5, wherein each one of said part of said processes uses said part of said designated area in a common extended storage as a lock byte area for storing a lock byte for obtaining access to a common data resource by use of said single instruction for executing the operations from said referring operation to said rewriting operation as an inseparable operation, and wherein each said process judges whether it can exclusively occupy said common data resource in response to a value of the lock byte.

7. A control method for use in a composite data processing system according to claim 6, wherein each one of said processes obtains access to data in said designated area in said extended storage, consisting of one of a lock byte and a counter area and a data area containing said common data resource by use of said instruction for executing the operations from said referring operation or comparison operation to said rewriting operation as an inseparable operation, confirming whether the access to said data does not conflict with other processes from the value of said lock byte or said counter area and simultaneously rewriting the data content so that a common data resource in said extended storage can be accessed while data consistency is maintained.

8. A control method for use in a composite data processing system according to claim 6, wherein said common data resource is disposed in a common external storage, wherein control data for managing said common data resource is disposed in said common extended storage, and each one of said processes handles said control data by use of said instruction for executing the operation from said referring operation or said comparison operation to said rewriting operation as an inseparable operation so as to thereby manage the access to said common data resource corresponding to said control data.

* * * * *